(12) United States Patent
Zhao et al.

(10) Patent No.: US 12,585,092 B2
(45) Date of Patent: Mar. 24, 2026

(54) PERISCOPIC CAMERA MODULE AND ELECTRONIC DEVICE

(71) Applicant: NINGBO SUNNY OPOTECH CO., LTD, Zhejiang (CN)

(72) Inventors: Bojie Zhao, Zhejiang (CN); Lifeng Yao, Zhejiang (CN); Dongli Yuan, Zhejiang (CN); Sisi Yu, Zhejiang (CN); Zhen Huang, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 827 days.

(21) Appl. No.: 17/761,351

(22) PCT Filed: Aug. 31, 2020

(86) PCT No.: PCT/CN2020/112486
§ 371 (c)(1),
(2) Date: Mar. 17, 2022

(87) PCT Pub. No.: WO2021/052157
PCT Pub. Date: Mar. 25, 2021

(65) Prior Publication Data
US 2022/0357567 A1 Nov. 10, 2022

(30) Foreign Application Priority Data

Sep. 18, 2019 (CN) .......................... 201910879844.0
Sep. 18, 2019 (CN) .......................... 201910879871.8
Sep. 18, 2019 (CN) .......................... 201910879872.2

(51) Int. Cl.
*G02B 23/08* (2006.01)
*G02B 13/00* (2006.01)
(Continued)

(52) U.S. Cl.
CPC ......... *G02B 13/0065* (2013.01); *G02B 23/08* (2013.01); *G02B 27/646* (2013.01);
(Continued)

(58) Field of Classification Search
None
See application file for complete search history.

(56) References Cited

U.S. PATENT DOCUMENTS 5,914,479 A 6/1999 Fikes et al.
6,498,624 B1 * 12/2002 Ogura .................... G02B 17/04
348/335
(Continued)

FOREIGN PATENT DOCUMENTS

CN 1245573 2/2000
CN 202975377 6/2013
(Continued)

OTHER PUBLICATIONS

International Search Report issued Nov. 30, 2020, in International (PCT) Application No. PCT/CN2020/112486, with English translation.
(Continued)

*Primary Examiner* — Derek S. Chapel
(74) *Attorney, Agent, or Firm* — Wenderoth, Lind & Ponack, L.L.P.

(57) ABSTRACT

Provided is a periscopic camera module, which includes a first reflective element mounted on a first base, an optical lens mounted on a second substrate, a second reflective element mounted on a third substrate, and a photosensitive chip mounted on a fourth substrate. Particularly, the first reflective element is used to reflect the incident light to make it longitudinally turned; the optical lens is used to receive the reflected light which is longitudinally turned and output an imageable light beam; the second reflective element is a
(Continued)

second prism, which is adapted to laterally turn the imageable light beam at least once and has a reflecting surface located on a side surface of the second prism; and the photosensitive chip is adapted to receive the imageable light beam laterally turned by the second reflective element. Also provided is a corresponding electronic device. The length of the periscopic camera module according to the present application may be reduced to be suitable for mass production on a large scale, thereby facilitating to improve production efficiency and yield.

15 Claims, 14 Drawing Sheets

(51) Int. Cl.

| | | |
|---|---|---|
| *G02B 27/64* | (2006.01) | |
| *G03B 3/10* | (2021.01) | |
| *G03B 5/00* | (2021.01) | |
| *G03B 17/17* | (2021.01) | |
| *G03B 30/00* | (2021.01) | |
| *H04N 23/51* | (2023.01) | |
| *H04N 23/55* | (2023.01) | |

(52) U.S. Cl.
CPC ................. *G03B 3/10* (2013.01); *G03B 5/00* (2013.01); *G03B 17/17* (2013.01); *G03B 30/00* (2021.01); *H04N 23/51* (2023.01); *H04N 23/55* (2023.01); *G03B 2205/0023* (2013.01); *G03B 2205/003* (2013.01)

(56) References Cited

U.S. PATENT DOCUMENTS

| | | | |
|---|---|---|---|
| 2004/0109076 | A1 | 6/2004 | Yokota et al. |
| 2006/0017834 | A1 | 1/2006 | Konno et al. |
| 2014/0267844 | A1 | 9/2014 | Iwata et al. |
| 2016/0131922 | A1* | 5/2016 | Nagahara ............. G02B 17/008 |
| | | | 359/434 |
| 2017/0242225 | A1* | 8/2017 | Fiske ...................... H04N 23/57 |
| 2018/0227566 | A1 | 8/2018 | Price et al. |
| 2019/0041725 | A1 | 2/2019 | Murayama |
| 2019/0246490 | A1 | 8/2019 | Li et al. |
| 2021/0044729 | A1* | 2/2021 | Wang ........................ G02B 7/08 |
| 2021/0199930 | A1* | 7/2021 | Chen ........................ G02B 7/08 |
| 2022/0294945 | A1* | 9/2022 | Zhao ...................... G03B 17/17 |
| 2023/0176340 | A1* | 6/2023 | Chiang .................. H04N 23/60 |
| | | | 359/736 |

FOREIGN PATENT DOCUMENTS

| | | |
|---|---|---|
| CN | 104635404 | 5/2015 |
| CN | 105652431 | 6/2016 |
| CN | 206002751 | 3/2017 |
| CN | 206096610 | 4/2017 |
| CN | 206115002 | 4/2017 |
| CN | 107515459 | 12/2017 |
| CN | 207037205 | 2/2018 |
| CN | 107948470 | 4/2018 |
| CN | 109239905 | 1/2019 |
| CN | 208581282 | 3/2019 |
| CN | 208581283 | 3/2019 |
| EP | 2 053 440 | 4/2009 |
| EP | 3 499 286 | 6/2019 |
| JP | 2003-222946 | 8/2003 |
| JP | 2006-171449 | 6/2006 |
| JP | 2010-78958 | 4/2010 |
| JP | 2017-067836 | 4/2017 |

OTHER PUBLICATIONS

Extended European Search Report dated Oct. 20, 2022 in corresponding European Patent Application No. 20864491.4.

* cited by examiner

PERISCOPIC CAMERA MODULE AND ELECTRONIC DEVICE

RELATED APPLICATIONS

This application claims the benefit of 3 priorities of Chinese patent application CN201910879871.8 filed on Sep. 18, 2019, titled "Periscopic Camera Module and Electronic Device"; Chinese patent application CN201910879844.0 filed on Sep. 18, 2019, titled "Periscopic camera Module and Corresponding Electronic Device"; and Chinese patent application CN201910879872.2 filed on Sep. 18, 2019, titled "Periscopic Camera Module and Electronic Device"; and the entire contents of the above three applications are incorporated herein by reference.

TECHNICAL FIELD

The present invention relates to the technical field of camera module, and in particular to a solution for a periscopic camera module and corresponding electronic device.

BACKGROUND ART

With the popularization of mobile electronic devices, the related technologies of camera module used in mobile electronic devices to help users obtain images (such as videos or images) have been rapidly developed and advanced, and in recent years, camera modules have been widely used in many fields such as medical treatment, security, industrial production and so on. In order to meet more and more extensive market demands, the irreversible development trends of existing camera modules are high pixel, large chip, small size, and large aperture.

At present, people's demand for camera functions of portable electronic devices (such as tablet computers, smart phones, etc.) is still increasing rapidly. The camera modules configured in electronic devices gradually realize background blur, night shooting, dual-camera zoom and many other functions. Particularly, due to the application of the periscopic camera module, the capability of dual-camera zoom is gradually increasing. For example, its optical zoom capability has been increased from 2× zoom to 3× zoom, or even 5× zoom. That is, the periscopic camera module has greatly changed people's perception of the photographic capability of portable electronic devices (such as smart phones), and has broad market prospects.

However, the existing periscopic camera modules have problems such as large size and complex structure. Inside a portable electronic device, such as a smartphone, each space is very precious. If the periscopic camera module occupies a large space, the size of other accessories such as batteries and motherboards will be sacrificed, which is not conducive to enhancing the comprehensive value of the mobile phone. Therefore, people expect the periscopic camera module to be reduced in size and more compact in structure.

On the other hand, the specialty of the periscopic camera module is mainly telephoto, i.e., to clearly capture distant pictures. As a result, periscopic camera modules often need to be equipped with optical lens with larger focal length. Under the limitation of optical theory, the optical path constructed based on the optical lens with large focal length needs to have sufficient length, which becomes one of the difficulties in reducing the size of the periscopic camera module of the mobile phone.

Furthermore, there is a huge demand in the current consumer electronics market, and products are updated very quickly. Therefore, it is also expected that the design solution of the camera module for portable electronic devices (e.g., smart phones) is suitable for mass production, and helps to improve production efficiency and yield. However, the periscopic camera module (especially the telephoto periscopic camera module) has many components and complex structure, which has higher requirements for assembly and is more difficult to assemble. Therefore, when a periscopic module is designed, at the same time of realizing the required functions and meeting its requirements for imaging quality, it is also necessary to consider whether its structure is easy to assemble, thereby improving the production efficiency and yield in mass production.

CONTENTS OF THE INVENTION

The object of the present invention is to overcome the deficiencies of the prior art and provide a solution to reduce the volume occupied by the periscopic camera module.

In order to solve the above technical problems, the present invention provides a periscopic camera module, which includes: a first reflective element, which is used to reflect incident light and make it longitudinally turned, wherein the first reflective element is mounted on a first base; an optical lens, which is used to receive the light reflected by the first reflective element and output an imageable light beam to an image side, wherein the optical lens is mounted on a second substrate; a second reflective element, which includes at least one second reflecting surface adapted to laterally turn the imageable light beam at least once, wherein the second reflective element is a second prism, and the second reflecting surface is located on a side surface of the second prism, and the second prism is mounted on a third substrate, and surfaces of the second substrate and the third substrate are both perpendicular to an incident direction of the incident light; and a photosensitive chip, which is adapted to receive the imageable light beam laterally turned by the second reflective element, wherein the photosensitive chip is adhered to a fourth substrate, and a surface of the fourth substrate is parallel to the incident direction of the incident light.

Particularly, a bottom surface of the second prism is bear against the third substrate, and the second prism and the third substrate are fixed together by adhering to or fitting with each other.

Particularly, the second prism is a triangular prism, and all optical surfaces of the second reflective element are located on the side surfaces of the triangular prism, wherein the optical surfaces includes a reflecting surface, an incident surface and an exit surface, and the reflecting surface includes the second reflecting surface.

Particularly, a cross-section of the second prism is a parallelogram, and two mutually parallel side surfaces of the second prism form two second reflecting surfaces, and all optical surfaces of the second reflective element are located on the side surfaces of the second prism, and the optical surfaces include a reflecting surface, an incident surface and an exit surface, and the reflecting surface includes the second reflecting surface.

Particularly, the second reflective element includes multiple groups of the second reflecting surfaces, each group has two second reflecting surfaces which are parallel to each other; any two adjacent groups of the second reflecting surfaces are arranged in a "V" shape or an inverted "V" shape, and the cross-section shape of the second prism is formed by splicing multiple "V" or inverted "V" shapes.

Particularly, the second reflective element includes at least two second reflecting surfaces which are 45-degree reflecting surfaces, and the first reflective element has a first reflecting surface which is a 45-degree reflecting surface.

Particularly, the periscopic camera module further includes a first housing which is mounted on a first base and covers the first reflective element.

Particularly, the periscopic camera module further includes a second housing which is mounted on a second substrate and covers the optical lens.

Particularly, the periscopic camera module further includes a third housing which is mounted on the third substrate and covers the second reflective element.

Particularly, the periscopic camera module further includes a cylindrical support which has an axis, a first open end and a second open end, wherein the axis is perpendicular to the surface of the fourth substrate, and the fourth substrate is mounted on the first open end, and the second open end is arranged at a position facing the exit surface of the second reflective element.

Particularly, both the first open end and the second open end have a rectangular shape.

Particularly, the exit surface of the second prism and the second open end have a first plug-in structure for adapting to each other, and the second prism is fitted with the cylindrical support through the first plug-in structure.

Particularly, a connection position of the first plug-in structure is provided with an adhesive material to reinforce the fitting of the second prism and the cylindrical support.

Particularly, the second substrate and the third substrate are a common substrate.

Particularly, the first base, the second substrate, the third substrate and the bottom surface of the cylindrical support are all mounted on a same reinforcement plate.

Particularly, the first reflective element is a first prism which is a triangular prism, wherein an inclined surface of the triangular prism is a reflecting surface, and the two mutually perpendicular side surfaces are respectively used as the incident surface and the exit surface of the first reflective element.

Particularly, the first base includes a base body and a first wedge-shaped support body installed in the base body, and the inclined surface of the first prism is installed and supported on the inclined surface of the first wedge-shaped support body.

Particularly, the first base further includes a driving module which is adapted to drive the first wedge-shaped support body to move relative to the base body.

Particularly, the optical lens includes a lens barrel and at least three lenses installed in the lens barrel, and the surface of the second substrate has positioning posts, and the lens barrel is mounted on the second substrate through the positioning posts.

Particularly, the outer contour of the lens barrel is rectangular, and the rear end of the lens barrel and the incident surface of the second prism are provided with a second plug-in structure for adapting to each other, and the second prism is fitted with the lens barrel through the second plug-in structure.

Particularly, a connection position of the second plug-in structure is provided with an adhesive material to reinforce the fitting of the second prism and the lens barrel.

Particularly, the third substrate includes a substrate body and a second wedge-shaped support body, and the inclined surface of the second prism is installed and bear against the inclined surface of the second wedge-shaped support body, and the second wedge-shaped support body may move relative to the base body under the driving of the driving module.

Particularly, the optical lens has an effective focal length greater than or equal to 15 mm, or a field angle of less than or equal to 25 degrees.

Particularly, the optical lens has an effective focal length greater than or equal to 18 mm, or a field angle of less than or equal to 20 degrees.

Particularly, the optical lens has an effective focal length greater than or equal to 25 mm, or a field angle of less than or equal to 15 degrees.

According to another aspect of the present application, there also provides an electronic device, which includes: any one of the above periscopic camera modules, wherein the incident direction of the incident light of the first reflective element is consistent with a thickness direction of the electronic device.

Compared with the prior art, the present application has at least one of the following technical effects:

1. The present application may reduce the volume of the periscopic camera module (especially, the length of the periscopic camera module may be reduced), so that the structure of the periscopic camera module may be more compact.

2. The present application may better adapt to optical lens with larger focal length.

3. The periscopic camera module according to the present application is suitable for mass production, and helps to improve production efficiency and yield.

4. The periscopic camera module according to the present application may reduce the loss caused by the light beam passing through different media, thereby ensuring that the photosensitive chip has enough light income, thereby improving the imaging quality.

5. The periscopic camera module according to the present application may have an anti-shake function.

6. The periscopic camera module according to the present application may have a zoom function.

7. The periscopic camera module according to the present application may realize anti-shake and zoom functions (especially high-magnification zoom capability) with a small occupied space.

SPECIFIC EXAMPLES

Figure 1:
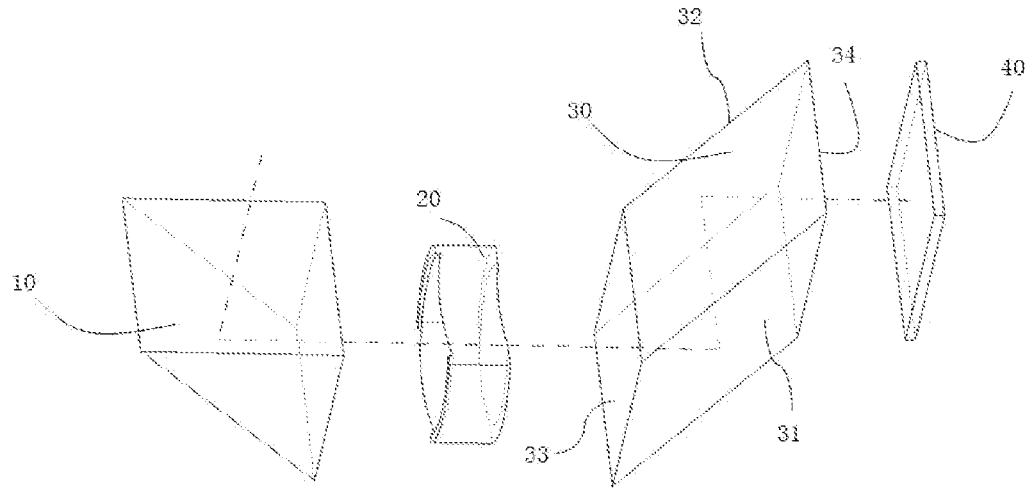
FIG. 1 shows a schematic perspective view of an optical path and optical elements of a periscopic camera module in an example of the present application.

For a better understanding of the present application, various aspects of the present application will be described in more detail with reference to the accompanying drawings. It should be understood that, these detailed descriptions are merely illustrative for exemplary examples of the present application and are not intended to limit the scope of the present application in any way. Throughout the specification, the same reference numerals refer to the same elements. The expression "and/or" includes any and all combinations of one or more of the associated listed items.

It should be noted that in this specification, the expressions such as first, second or the like are only used to distinguish one feature from another feature, and do not imply any limitation on the feature. Accordingly, a first body discussed below could also be referred to as a second body without departing from the teachings of the present application.

In the drawings, the thickness, size and shape of objects have been slightly exaggerated for convenience of explanation. The drawings are examples only, and are not drawn strictly to scale.

It will also be understood that, the terms "include", "including", "having", "include" and/or "comprising" when used in this specification mean the presence of stated features, integers, steps, operations, elements and/or parts, but do not exclude the presence or addition of one or more other features, integers, steps, operations, elements, parts and/or combinations thereof. Also, when the expression "at least one of" appears before a list of listed features, it modifies the entire listed feature and not the individual elements of the list. Further, at the time of describing examples of the present application, the use of "may" means "one or more examples of the present application." Also, the term "exemplary" is intended to refer to an example or illustration.

As used herein, the terms "substantially," "approximately," and similar terms are used as terms of approximation, not of degree, and are intended to describe the inherent bias in a measured value or calculated value that would be recognized by those of ordinary skill in the art.

Unless otherwise defined, all terms (including technical and scientific terms) used herein have the same meaning as commonly understood by one of ordinary skill in the art to which this application belongs. It should also be understood that, terms (such as those defined in commonly used dictionaries) should be interpreted to have meanings consistent with their meanings in the context of the related art, and will not be interpreted in an idealized or overly formal sense, unless it is expressly defined herein.

It should be noted that, the examples according to the present application and the features of the examples may be combined with each other in the case of no conflict.

FIG. 1 shows a schematic perspective view of an optical path and optical elements of a periscopic camera module in an example of the present application. Referring to FIG. 1, in this example, the periscopic camera module includes: a first reflective element 10, an optical lens 20, a second reflective element 30 and a photosensitive chip 40 arranged in sequence along the optical path. Particularly, the first reflective element 10 is used to reflect the incident light and make it turn 90 degrees in the longitudinal direction (it should be noted that in this example, a certain tolerance is allowed for the turning angle, i.e., if the turning angle of the light beam is within the tolerance range, it may be regarded as turning 90 degrees). The optical lens 20 is used to receive the light reflected by the first reflective element 10 and output an imageable light beam to an image side. The second reflective element 30 includes two reflecting surfaces adapted to laterally turn the imageable light beam twice. The photosensitive chip 40 is adapted to receive the imageable light beam laterally turned by the second reflective element 30. It should be noted that, in order to show the optical path more clearly, a module housing, a driver, a support, an IR color filter, a connection structure between optical elements, circuit board components and other structures are omitted in FIG. 1. It should be understood that, these omitted structures in FIG. 1 may be part of the periscopic camera module. In this example, the longitudinal direction refers to an incident direction of the incident light of the first reflective element, i.e., the incident direction of the incident light of the entire periscopic camera module, and the lateral direction refers to a direction perpendicular to the longitudinal direction.

The imaging optical path of the periscopic camera module of this example will be described in more detail below.

Firstly, the incident light is reflected by a first reflecting surface of the first reflective element 10, then it is turned 90 degrees in the longitudinal direction to reach the optical lens. Particularly, at least three lenses may be included in the optical lens 20. Next, the light beam passes through the optical lens 20 to the second reflective element 30 and is reflected by its first one of the second reflecting surface, the light beam is laterally turned by about 90 degrees to reach another second reflecting surface of the second reflective element 30, and the light beam is then turned horizontally by about 90 degrees and finally reaches the photosensitive chip 40. In this example, the first reflective element 10 and the second reflective element 30 may both be prisms. In other examples, the first reflective element 10 and the second reflective element 30 may both be reflecting mirrors; alternatively, the first reflective element 10, the second reflective element 30 may be a combination of a reflecting mirror and a prism. A reflecting surface of the prism may be realized based on the principle of total reflection; and a reflecting surface of the mirror may be realized based on the principle of specular reflection. In this example, both of the first reflecting surface and the second reflecting surface may be 45-degree reflecting surfaces. It should be noted that, considering the manufacturing and assembly tolerances, the layout angle of the first reflecting surface and the second reflecting surface are not required to be absolutely equal to 45 degree; as long as the angles are within the tolerance range, they may be regarded as reflecting surfaces at an angle of about 45 degrees to incident light. More particularly, a 45-degree reflecting surface may be understood as a reflecting surface at an angle of about 45 degrees to the incident light. In this application, the deviation value is within 5 degrees, which may be regarded as a normal tolerance. For example, when the angle between the two is 40-50 degrees, it may be regarded as an angle of 45 degrees; when the angle between the two is within the range of ±5 degrees, the two may be regarded as parallel; when the angle between the two is 85-95 degrees, the two may be regarded as vertical. Further, in this example, the first reflective element 10 is a triangular prism, and an inclined surface of the triangular prism is the first reflecting surface 11, and the two mutually perpendicular side surfaces of the triangular prism are respectively used as an incident surface 12 and an exit surface 13 of the first reflective element.

Figure 3:
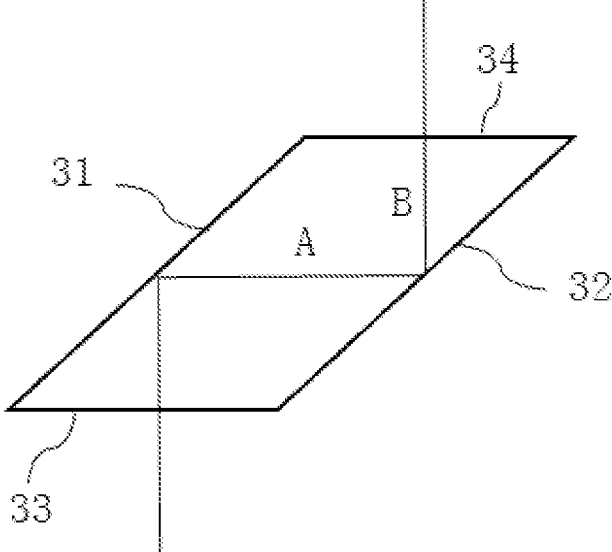
FIG. 3 shows a schematic diagram of an internal light path of a second reflective element 30.

The periscopic camera module of this example is a telephoto periscopic module. The telephoto periscopic module may have an effective focal length greater than or equal to 15 mm; alternatively, it may have a field angle of less than or equal to 25 degrees. Generally speaking, a longer focal length must have a longer back focal length (a distance between a surface of the last lens of the lenses and the photosensitive chip), since the image will be clear only when the photosensitive chip is near the focal length. If the design of a conventional periscopic module is adopted (prism-lenses-photosensitive chip are in a straight line), an overall length of a periscopic camera module with an effective focal length greater than or equal to 15 mm will be very large (for example, more than 20 mm, or even more than 25 mm), which would take up a lot of space inside the phone, and it is not desirable. Therefore, in this example, in order to reduce the overall length of the telephoto periscopic module, a reflective element is arranged behind the lenses to turn the light again. Further, FIG. 3 shows a schematic diagram of an internal optical path of the second reflective element 30. As shown in FIG. 1 and FIG. 3, in this example, the second reflective element 30 is arranged behind the optical lens, wherein the second reflective element 30 is a prism which is provided with two second reflecting surfaces 31 and 32 (which may be realized based on the principle of total reflection); and the two second reflecting surfaces 31 and 32 are basically parallel, the light is incident from the incident surface 33, and firstly undergoes a lateral turning A of about 90 degrees in the second reflective element 30, and then undergoes a lateral turning B of about 90 degrees once again, thereby restoring the direction of the light beam entering the second reflective element 30, and finally exit from the exit surface 34. This design may reduce the overall length of the periscopic module, and the reduced length is approximately equal to the length of the lateral turning A. Further, in this example, the incident direction of the incident light entering the first reflective element 10 is parallel to the photosensitive surface of the photosensitive chip 40. The incident direction of the incident light of the first reflective element 10 is the incident direction of the incident light of the entire periscopic camera module, i.e., the thickness direction of the electronic device (such as a smart phone) equipped with the periscopic camera module. In this example, the surface of the photosensitive chip 40 is parallel to the thickness direction of the electronic device, thereby preventing the circuit board, color filter, and related supports which attach to the photosensitive chip from occupying the space in the thickness direction of the electronic device, and facilitating to control or reduce the thickness of electronic device.

Figure 2:
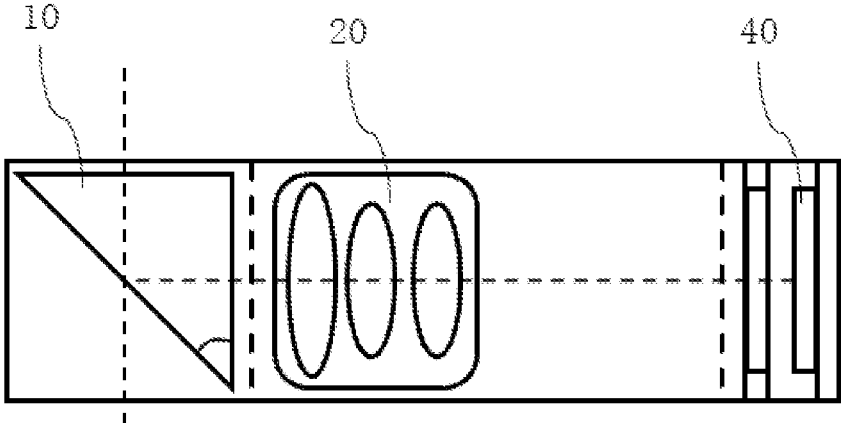
FIG. 2 shows a schematic diagram of the principle of an optical path of a periscopic camera module in a comparative example.

More particularly, FIG. 2 shows a schematic diagram of the principle of an optical path of a periscopic camera module of a comparative example. In this comparative example, a typical structure of a periscopic camera module currently used in a mobile phone is adopted. Referring to FIG. 2, in this comparative example, the optical elements are substantively arranged in a straight line; i.e., after entering the first reflective element, the incident light is longitudinally turned by 90 degrees, then passing through the optical lens and entering the photosensitive chip along a straight line. However, for high magnification telephoto modules (sometimes called telephoto modules), it often needs to be equipped with an optical lens with a larger focal length. For clear imaging, the photosensitive chip needs to be arranged near the focal point; as a result, in the periscopic camera module with a traditional structure, the photosensitive chip has to be arranged far away from the rear surface of the optical lens, thereby making the length of the periscopic camera module longer, which is not conducive to reducing the interior space occupied by the camera module in the electronic device. In the example of the present application shown in FIG. 1, the imageable light beam passing through the optical lens is folded by arranging a second reflective element in a rear focal section of the camera module, so that the photosensitive chip may be arranged at a position closer to the optical lens, thereby making the structure of the camera module compact and facilitating to reduce the volume occupied by the camera module.

Further, still referring to FIG. 1, in an example of the present application, the second reflective element 30 is a prism, a cross-section of the prism is a parallelogram, and the two mutually parallel side surfaces of the prism form two second reflecting surfaces 31 and 32. Since the refractive index n of the prism is usually greater than 1, it is assumed that the light travels a distance of length L in the second reflective element 30, and in terms of optical angle, it may be considered that the light travels a distance of length nL (i.e., the optical path of the light passing through the prism)); accordingly, the arrangement of a prism behind the optical lens as the second reflective element 30 may reduce the overall optical path by a length of (nL-L). From this perspective, the photosensitive chip may also be arranged at a position closer to the rear surface of the optical lens, thereby making the structure of the camera module compact and facilitating to reduce the volume occupied by the camera module.

Further, still referring to FIG. 1, in an example of the present application, a prism of which a cross-section is a parallelogram is used as the second reflective element 30, and the two end surfaces of the prism respectively constitute the incident surface 33 and the exit surface 34 of the second reflective element 30. This design helps reduce beam loss due to traversing different media. Particularly, in the prior art, a triangular prism or a reflecting mirror is usually used to realize the reflecting surface. The shape of the triangular prism may refer to the first reflective element 10 in FIG. 1. The inclined surface of the triangular prism is usually the reflecting surface, and the two mutually perpendicular side surfaces may be used as the incident surface and the exit surface respectively. If one want the light to turn at least twice behind the optical lens, then the conventional practice is to arrange two prisms behind the lens. However, in this example, a prism of which a cross-section is a parallelogram is used as the second reflective element 30, and its volume is smaller than that of two triangular prisms. Further, for the solution of using two prisms to realize the two second reflecting surfaces, the light path will be prism-air-prism, so that the light will inevitably be lost at the interface between the prism and the air; for a telephoto periscopic module that has insufficient light intake, this loss may be unbearable. In this example, however, the two second reflecting surfaces 31 and 32 are integrated on a single reflective element, i.e., integrated on a prism of which a cross-section is a parallelogram. In this way, the number of the second reflective elements is reduced, thereby reducing the assembly difficulty and avoiding the volume increase caused by multiple reflective elements. Furthermore, compared with the solution of two triangular prisms, this example may reduce one extra incident surface and one extra exit surface, and the light is only transmitted in the same one prism, which may reduce the light loss in the process of prism-air-prism, thereby ensuring that the photosensitive chip may receive enough entering light to improve the image quality. Of course, this design of FIG. 1 is not unique, and in other examples, the second reflective element 30 may be replaced by two separate reflecting mirrors. At this time, the light is reflected by the mirrors, and the process after the light is emitted from the lens is mirror-air-minor-air. Since the light does not need to pass through a thicker prism, this design may also reduce the light loss to a certain extent.

Figure 6:
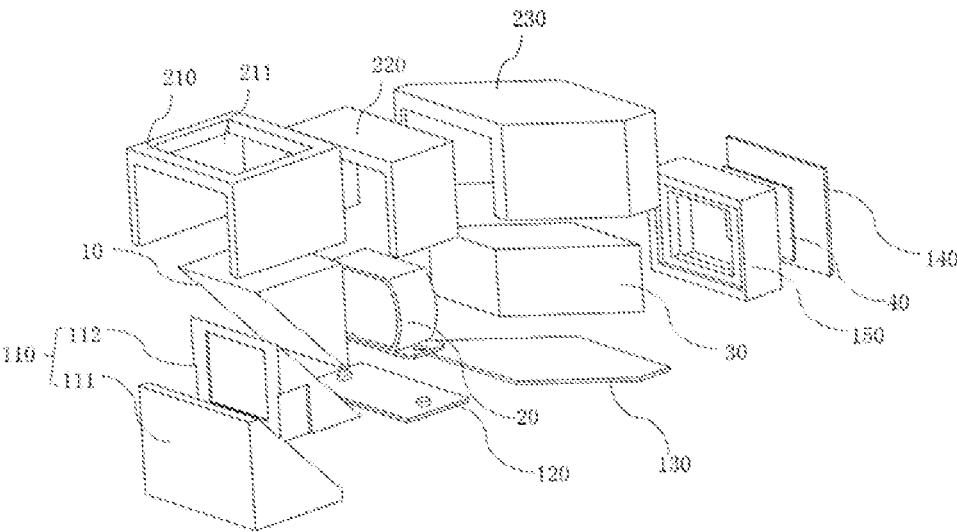
FIG. 6 shows a schematic exploded perspective view of a periscopic camera module in an example of the present application.

Further, FIG. 6 shows a schematic exploded perspective view of a periscopic camera module in an example of the present application. FIG. 1 shows a three-dimensional schematic diagram of the optical path and the optical elements of the periscopic camera module in this example. A series of structural components are added in FIG. 6 based on the components shown in FIG. 1. Referring to FIG. 6, in this example, the periscopic camera module includes: the first reflective element 10, the optical lens 20, the second reflective element 30 and the photosensitive chip 40 arranged in sequence along the optical path. In this example, the first reflective element 10 is mounted on a first base 110, the optical lens 20 is mounted on a second substrate 120, the second reflective element 30 is a second prism, and the second reflecting surface is located on the side surface of the second prism, and the second prism is mounted on a third substrate 130, and the surfaces of the second substrate 120 and the third substrate 130 are both perpendicular to incident direction of the incident light (referring to the incident light entering the first optical element—the first reflective element 10 of the entire periscopic camera module). The photosensitive chip 40 is attached on a fourth substrate 140, and a surface of the fourth substrate 140 is parallel to the incident direction of the incident light (same as above, no further elaboration). In this example, two mutually parallel side surfaces of the second prism constitute two second reflecting surfaces, and all optical surfaces of the second reflective element are located on the side surfaces of the second prism, wherein the optical surfaces include: a reflecting surface (the reflecting surface includes the second reflecting surface), an incident surface and an exit surface. The bottom surface of the second prism is a parallelogram plane, and the parallelogram plane may be used as a stable and reliable support surface. The bottom surface of the second prism may bear against and bonded to the surface of the second substrate. In this example, due to the use of a second prism of which a cross-section is a parallelogram, the second prism may provide two reflecting surfaces at the same time, thereby avoiding an excessively large number of optical elements, and avoiding an excessive assembly process while realizing optical path folding. Moreover, since the bottom surface of the second prism may provide a stable and reliable support surface, the camera module of this example also has the advantages of high reliability and easy assembly. Therefore, the structure of the camera module in this example helps to improve the production yield and production efficiency. It should be noted that, the second prism may also be mounted on the third substrate 130 in other ways than bonding. For example, in another example, the second prism may be engaged with the third substrate 130; and at this time, the bottom surface of the second prism may still be used as a support surface, thereby improving the reliability of the assembly structure and reducing the difficulty of assembly. In another example, the second prism may also be assembled with the third substrate through an intermediate structural component, and the intermediate structural component may be used to drive the second prism, thereby realizing the optical image stabilization function.

Further, still referring to FIG. 6, in an example of the present application, the periscopic camera module may further include: a first housing 210, a second housing 220, a third housing 230 and a cylindrical support 150. The first housing 210 is mounted on the first base 110 and covers the first reflective element 10. A top surface of the first housing 210 may have a light window 211 for incidence of the incident light. The second housing 220 is mounted on the second substrate 120 and covers the optical lens 20. The third housing 230 is mounted on the third substrate 130 and covers the second reflective element 30. A shape of the third housing 230 may be adapted to a shape of the second reflective element 30. For example, when the second reflective element 30 is a prism of which a cross-section is a parallelogram, a cross-section of the third housing 230 may also be a parallelogram. Further, in this example, the cylindrical support 150 has an axis, a first open end and a second open end, wherein the axis is perpendicular to the surface of the fourth substrate 140, and the fourth substrate 140 (the photosensitive chip may be attached on the surface of the fourth substrate) is mounted on the first open end, and the second open end is arranged at a position facing the exit surface of the second reflective element 30.

Figure 4:
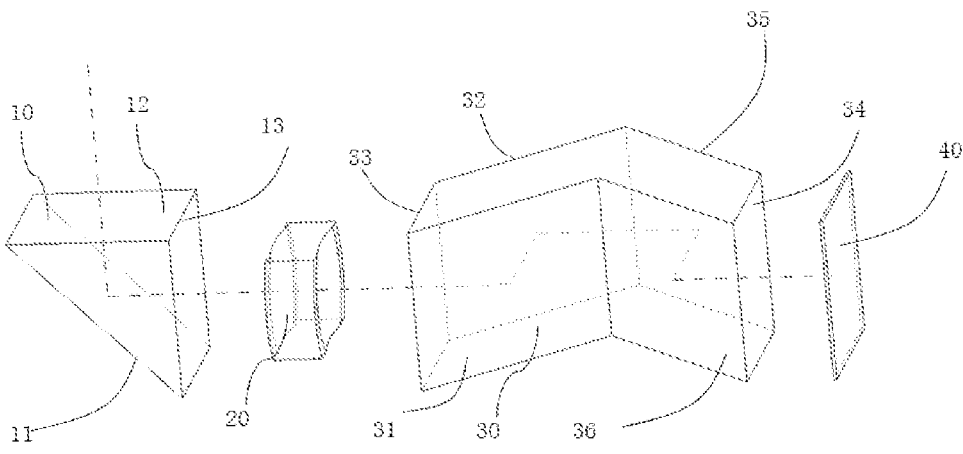
FIG. 4 shows a schematic perspective view of an optical path and optical elements of a periscopic camera module in another example of the present application.
Figure 5:
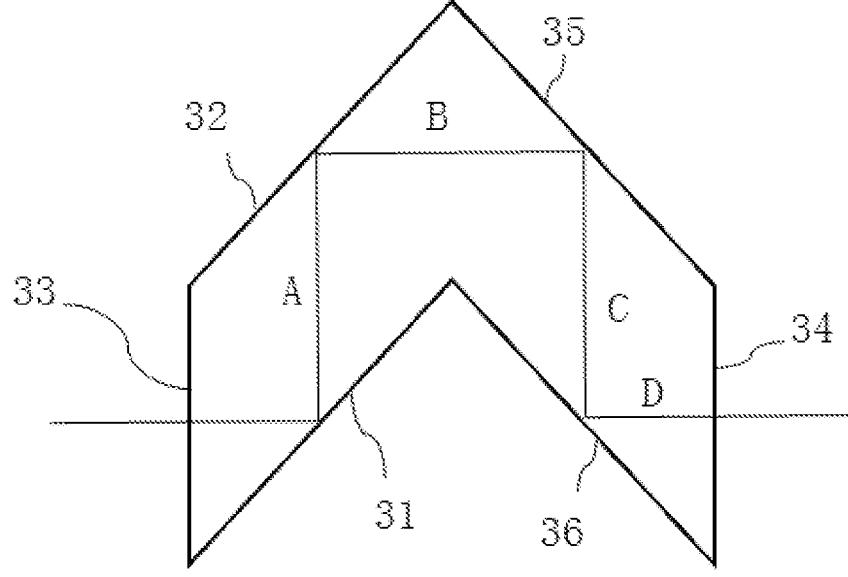
FIG. 5 shows a schematic diagram of an internal optical path of a prism with a cross-section of an inverted "V" shape in another example of the present application.

Further, FIG. 4 shows a schematic perspective view of an optical path and optical elements of a periscopic camera module in another example of the present application. Referring to FIG. 4, in this example, a special-shaped prism is adopted in the second reflective element 30, and the prism has two groups of second reflecting surfaces, wherein each group has two second reflecting surfaces which are parallel to each other. Also, the two groups of second reflecting surfaces are arranged in an inverted "V" shape. The second reflecting surfaces are all formed by the side surfaces of the prism, and the two end surfaces of the prism respectively constitute the incident surface 33 and the exit surface 34 of the second reflective element 30. More particularly, referring to FIG. 4, two second reflective elements 31, 32 constitute a first group, the other two second reflective elements 35, 36 constitute a second group, and the first group and the second group together constitute an inverted "V" shape. Further, in this example, the cross-section of the prism constituting the second reflective element 30 is in an inverted "V" shape. FIG. 5 shows a schematic diagram of an internal light path of a prism of which a cross-section is an inverted "V" shape in another example of the present application. Referring to FIG. 4 and FIG. 5, in this example, the light passes through and is reflected by the reflecting surface 11 of the first reflective element 10, then turning 90 degrees to reach the optical lens 20 (which contains at least three lenses), and passing through the optical lens 20 to reach the second reflective element 30 and being reflected by the second reflecting surface 31; after the light turns 90 degrees laterally to reach the second one of the second reflecting surface 32, it is turned 90 degrees laterally to reach the third one of the second reflecting surface 35, and then turned 90 degrees to reach the fourth one of the second reflecting surface 36, and finally turned 90 degrees laterally to reach the photosensitive chip. In this example, the first reflective element 10 and the second reflective element 30 are both prisms. However, it should be understood that, in other examples of the present application, the first reflective element 10 and the second reflective element 30 may both be a reflecting mirror, or a combination of a reflecting mirror and a prism. Further, in this example, the incident direction of the incident light entering the first reflective element 10 is parallel to the photosensitive surface of the photosensitive chip 40.

Further, referring to FIG. 5, the light becomes an imageable light beam after passing through the optical lens, and after incidence of the imageable light beam on the second reflective element 30, the light undergoes four lateral turnings A, B, C, and D, wherein the lengths of turnings A and C contribute to reducing the overall length of the telephoto periscopic module, i.e., the length that may be reduced from the overall length of the telephoto periscopic module is close to the sum of the lengths of turnings A and C. Therefore, the solution of this example may significantly reduce the overall length of the periscopic module, thereby making the module structure compact. Moreover, in this example, four surfaces of the second reflecting surfaces 31, 32, 35 and 36 are integrated on the same second reflective element 30, which not only reduces the number of reflective elements and reduces the difficulty of assembly, but also avoids the volume increase caused by multiple reflecting elements. Furthermore, the solution of this example may also reduce redundant incident surface and exit surface, thereby reducing the light loss in the process of prism-air-prism.

Further, still referring to FIG. 4, in one example of the present application, the second reflective element may be an axisymmetric shape. In this way, the optical paths of the two lateral turnings A and C experienced by the light in the second reflective element 30 are as equal as possible, so that the light exit from the second reflective element 30 may coincide with the light entering the second reflective element as much as possible, so that a center of the exit surface 13 of the first reflective element 10, a center of the optical lens 20, a center of the incident surface 33 of the second reflective element 30, a center of the exit surface 34 of the second reflective element 30 and a center of the imaging plane of the photosensitive chip 40 are kept on a same straight line as much as possible, i.e., the concentricity of all components is increased. By increasing the concentricity of all components, it may help improve image quality. Of course, in other examples of the present application, the centers of the above components may not be required to be on the same straight line, thereby reducing the requirements on assembly accuracy, which may be applied to telephoto periscopic camera modules that do not require high imaging quality.

Further, still referring to FIG. 4, the telephoto periscopic module with the inverted "V"-shaped prism provided in this example may have an effective focal length greater than or equal to 18 mm, alternatively it may have a field angle of less than or equal to 20 degrees. Preferably, the telephoto periscopic module may have an effective focal length greater than or equal to 25 mm, alternatively it may have a field angle of less than or equal to 15 degrees. It should be noted that, as a comparison, for a conventional periscopic camera module based on a linear design (as shown in FIG. 3), the overall length of the periscopic camera module with an effective focal length greater than or equal to 18 mm will be very large (for example, more than 25 mm, even more than 30 mm). In the solution shown in FIG. 4, the overall length of the periscopic camera module may be significantly reduced.

Further, based on the design of the second reflective element 30 in FIG. 4, a series of modified examples may also be derived. In the example of FIG. 4, the special-shaped prism used as the second reflective element 30 has two groups of four second reflecting surfaces; while in other modified examples, the special-shaped prism used as the second reflective element 30 may have more groups of the second reflecting surfaces. These second reflecting surfaces may be cyclically arranged with the two groups of reflecting surfaces shown in FIG. 4 as basic units; i.e., the cross-section of the special-shaped prism may be a shape formed by splicing multiple "V" shapes or inverted "V" shapes (for example, a "W" shape or an inverted "W" shape). In other words, in a modified example, the second reflective element 30 may include multiple groups of the second reflecting surfaces, wherein each group has two second reflecting surfaces which are parallel to each other, and any two adjacent groups of the second reflecting surfaces are arranged in a "V" shape or an inverted "V" shape. The second reflective element is a single prism, the side surfaces of the prism constitute the second reflecting surfaces, and the two end surfaces of the prism constitute the incident surface and the exit surface of the second reflective element respectively. The cross-section of the prism is in a "V" shape or an inverted "V" shape, or a shape formed by splicing multiple "V" shapes and/or multiple inverted "V" shapes.

Further, in an example of the present application, a series of structural components for assembly may be added in the periscopic camera module on the basis of FIG. 4. These structural components may be similar to those shown in FIG. 6; i.e., in this example, the periscopic camera module may further include: the first base, the second substrate, the third substrate, the fourth substrate, the first housing, the second housing, the third housing and the cylindrical support. Particularly, the shapes of the third substrate and the third housing may be adapted to the shapes of the special-shaped prisms in this example, and the shapes and positional relationships of the remaining structural components are described with reference to FIG. 6 and the corresponding description above, no further elaboration here.

Figure 7:
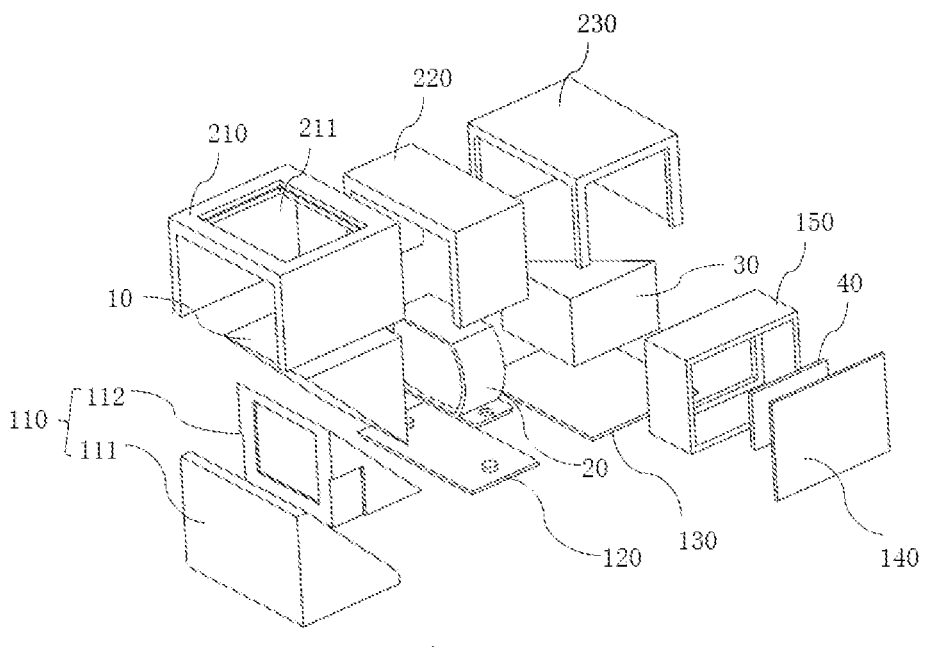
FIG. 7 shows a schematic exploded perspective view of a periscopic camera module in another example of the present application.

It should be noted that, in the foregoing examples, the second reflective element 30 is a prism with two or more second reflecting surfaces, but the second reflective element 30 of the present application is not limited thereto. For example, in another example, the second reflective element 30 may be a triangular prism. FIG. 7 shows a schematic exploded perspective view of a periscopic camera module in another example of the present application. Referring to FIG. 7, in this example, the second reflective element 30 is a triangular prism having only one second reflecting surface. Particularly, the triangular prism has one incident surface, one exit surface and one second reflecting surface, wherein the second reflecting surface is an inclined surface of the triangular prism. In this example, all the optical surfaces of the second reflective element 30 are located on the side surfaces of the triangular prism (wherein the optical surfaces include a reflecting surface, an incident surface and an exit surface). In this example, the optical path is only turned laterally once in the second reflective element 30, but the optical path may still be folded to a certain extent to reduce the length of the camera module. In addition, in this example, the shape of the second reflective element 30 is simple and the process is mature, which helps to improve production efficiency and yield. Moreover, compared with other complex shapes, the triangular prism is also easier to process the plug-in structure on the incident surface and/or the exit surface, thereby facilitating to further improve the assembly efficiency and improve the structural stability and reliability of the camera module. The triangular prism is also beneficial to combine with the driver to realize the optical image stabilization function.

Further, still referring to FIG. 7, in an example of the present application, the first reflective element 10 is a first prism, the first prism is a triangular prism, an inclined surface of the triangular prism is a reflecting surface, and the two mutually perpendicular side surfaces are respectively used as the incident surface and the exit surface of the first reflective element 10. The first base 110 includes a base body 111 and a first wedge-shaped support body 112 installed in the base body 111, and the inclined surface of the first prism is installed and bear against the inclined surface of the first wedge-shaped support body 112. The first base 110 may further include a driving module adapted to drive the first wedge-shaped support body 112 to move relative to the base body 111. The driving module may include a first driver and a second driver, and driving directions of the first driver and the second driver may be orthogonal. In this way, more freedom of movement may be provided for the first reflective element, thereby better realizing functions such as optical image stabilization.

Figure 8:
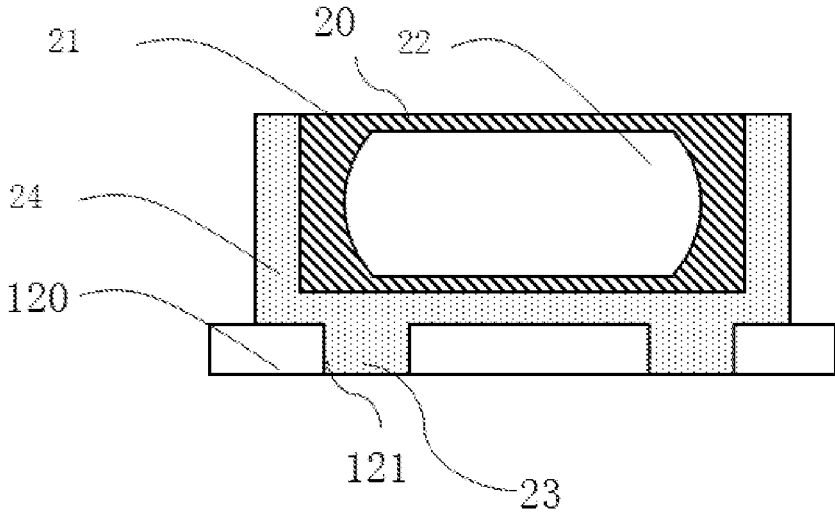
FIG. 8 shows a schematic cross-sectional view of the connection relationship between an optical lens 20 and a second substrate 120 in another example of the present application.

Further, still referring to FIG. 7, in one example of the present application, the optical lens 20 includes a lens barrel and at least three lenses installed in the lens barrel. The surface of the second substrate 120 has positioning posts, and the bottom of the lens barrel may have corresponding positioning holes, and the lens barrel is installed on the second substrate 120 through the engagement of the positioning holes and the positioning posts. Further, the engagement between the second substrate 120 and the lens barrel may also be reinforced by glue. Further, FIG. 8 shows a schematic cross-sectional view of the connection relationship between the optical lens 20 and the second substrate 120 in another example of the present application. Referring to FIG. 8, in this example, the optical lens 20 includes a lens barrel 21 and at least three lenses 22 installed in the lens barrel (as a cross-sectional view, only one of the lenses is shown). The surface of the second substrate 120 has positioning holes 121, and the lens barrel 21 is mounted on the second substrate 120 through the engagement of the positioning posts 23 and the positioning holes 121. In this example, the lens barrel 21 may be first installed in a positioning structural component 24, the bottom of the positioning structural component 24 has positioning posts 23 which are engaged with the positioning holes 121 of the second substrate 120. Further, the engagement between the second substrate 120 and the positioning structural component 24 may also be reinforced by glue. In this example, since the lens barrel 21 does not need to be directly provided with the positioning structure, nor does it need to process the positioning structure on the lens barrel, the manufacturing process of the lens barrel may be simplified, thereby facilitating to improve the yield.

Figure 9:
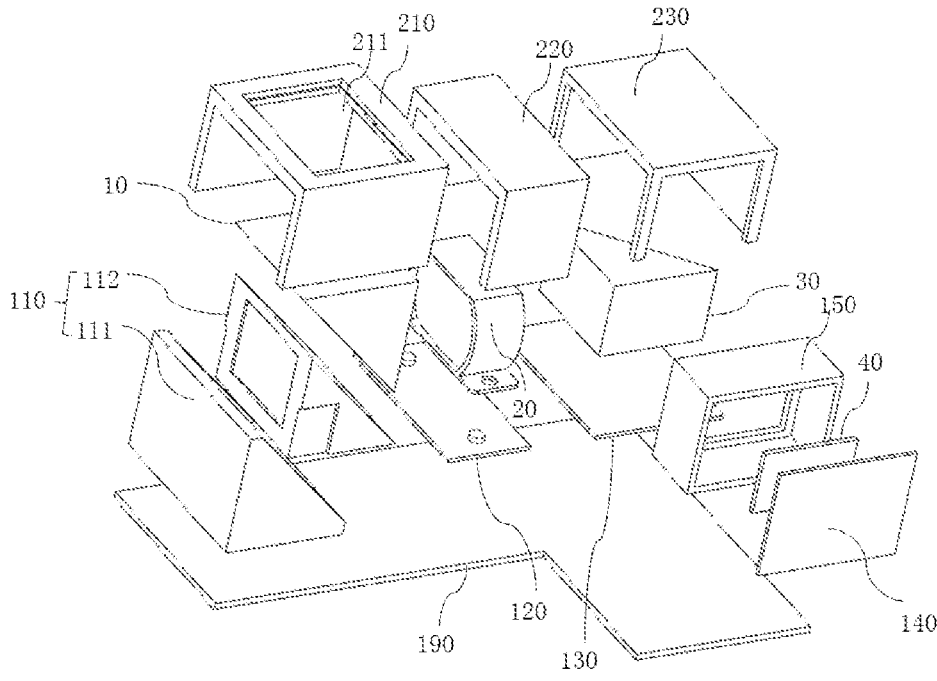
FIG. 9 shows a schematic exploded perspective view of a periscopic camera module in yet another example of the present application.

Further, FIG. 9 shows a schematic exploded perspective view of a periscopic camera module in yet another example of the present application. Referring to FIG. 9, in this example, the first base 110, the second substrate 120, the third substrate 130 and the bottom surface of the cylindrical support 150 are all mounted on a same reinforcement plate 190. Other components and structures of this example are the same as those of the example of FIG. 7, and will not be described again. In this example, by adding the reinforcement plate 190, the structural strength and bottom surface flatness of the telephoto periscopic camera module may be increased, thereby improving the imaging quality and the production yield.

Figure 10:
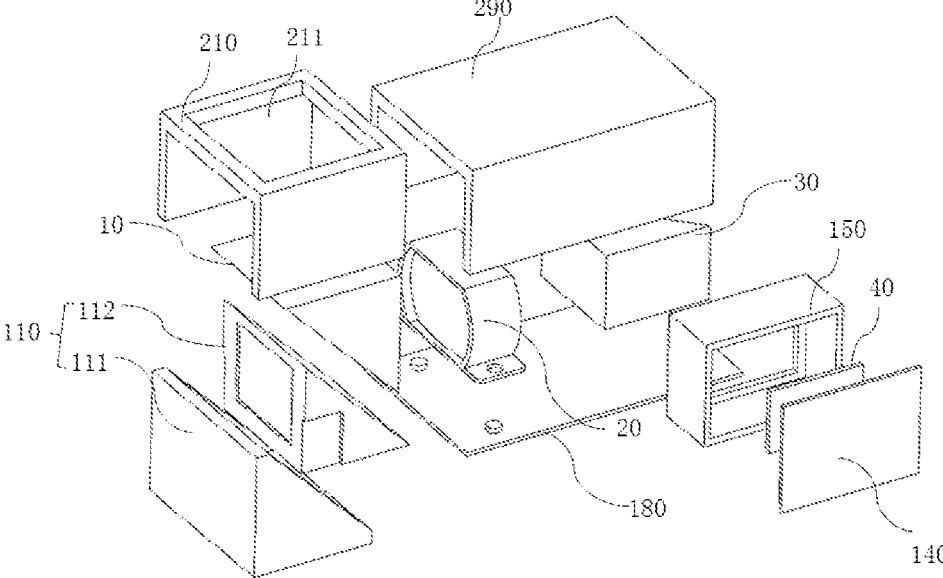
FIG. 10 shows a schematic exploded perspective view of a periscopic camera module in still another example of the present application.

Further, FIG. 10 shows a schematic exploded perspective view of a periscopic camera module in still another example of the present application. Referring to FIG. 10, in this example, the second substrate 120 and the third substrate 130 (referring to FIG. 7) share a same substrate 180 (referring to FIG. 10). Further, the second housing 220 and the third housing 230 (referring to FIG. 7) may also be a same shared housing 290 (referring to FIG. 10). This design may increase the consistency of the installation of the lenses and the second prism, thereby increasing the co-axiality of the lenses and the prism, i.e., the centers of them may be better aligned, thereby reducing the complexity of the structure and the difficulty of assembly.

Figure 11:
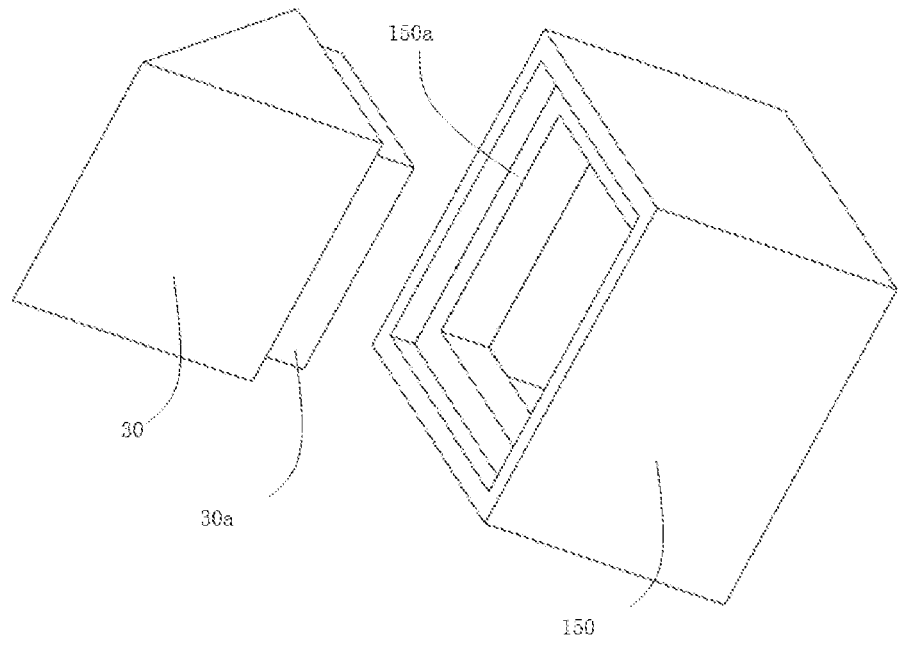
FIG. 11 shows a schematic diagram of the connection relationship between a second reflective element 30 and a cylindrical support 150 in an example of the present application.

Further, FIG. 11 shows a schematic diagram of the connection relationship between the second reflective element 30 and the cylindrical support 150 in an example of the present application. Referring to FIG. 11, in this example, the second reflective element 30 (i.e., the second prism) is a triangular prism. The cylindrical support 150 has an axis and a first open end and a second open ends. The first open end and the second open end each have a rectangular contour. The exit surface of the second prism and the second open end have a first plug-in structure for adapting to each other, and the second prism is fitted with the cylindrical support 150 through the first plug-in structure. Particularly, in this example, a boss 30a for plugging may be processed on the exit surface of the second prism, the second open end of the cylindrical support 150 has a mounting groove 150a, and the boss 30a may be embedded in the mounting groove 150a. In other words, the boss 30a and the mounting groove 150a may form the first plug-in structure for adapting to each other. Adhesive material may be provided at the connection position of the first plug-in structure to reinforce the fitting of the second prism and the cylindrical support 150.

Figure 12:
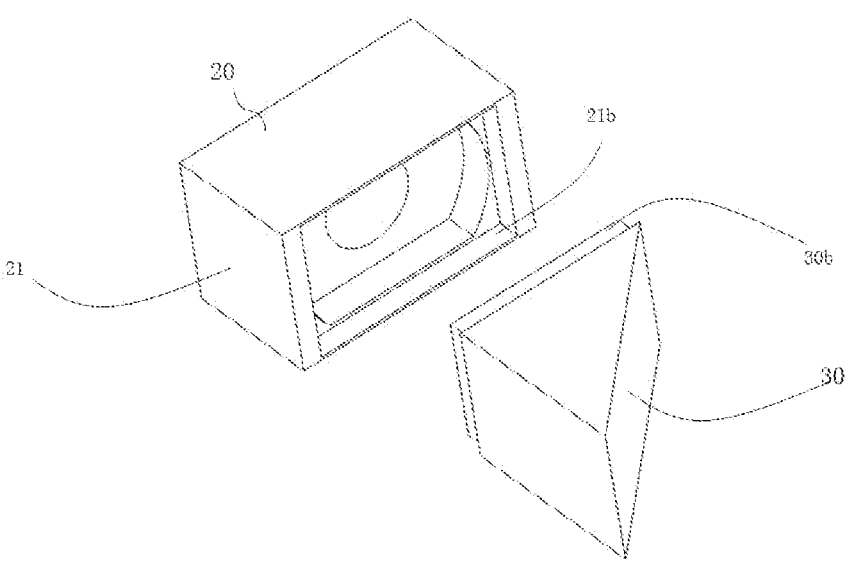
FIG. 12 shows a schematic diagram of the connection relationship between the second reflective element 30 and the optical lens 20 in an example of the present application.

Further, FIG. 12 shows a schematic diagram of the connection relationship between the second reflective element 30 and the optical lens 20 in an example of the present application. Referring to FIG. 12, in this example, the optical lens 20 includes a lens barrel 21 and at least three lenses 22 (not shown in FIG. 12) installed in the lens barrel 21. The outer contour of the lens barrel 21 may be rectangular, and a rear end of the lens barrel 21 (i.e., the exit end of the optical lens) and the incident surface of the second prism have a second plug-in structure for adapting to each other, and the second prism may be fitted with the lens barrel 21 through the second plug-in structure. Particularly, in this example, a boss 30b for plugging may be processed on the incident surface of the second prism, a rear end of the lens barrel 21 has a mounting groove 21b, and the boss 30b may be embedded in the mounting groove 21b. In other words, the boss 30b and the mounting groove 21b may form the second plug-in structure for adapting to each other. Adhesive material may also be provided at the connection position of the second plug-in structure to reinforce the fitting of the second prism and the lens barrel 21. Further, in this example, the front end of the lens barrel 21 (i.e., the incident end of the optical lens 20) may also form a diaphragm with a circular aperture (light-passing hole), thereby better adapting to the circular lens. In this example, firstly the optical lens 20 and the second prism may be combined, and then the combination of the optical lens 20 and the second prism may be mounted on the second substrate 120 and the third substrate 130 (the second substrate and the third substrate may be the same shared substrate 180), so that the co-axiality between the optical lens and the second prism may be increased, i.e., the centers of the optical lens and the second prism may be better aligned.

In other examples, the second prism may also be fitted with the cylindrical support through a prefabricated intermediate structural component, and the fitting may be reinforced with glue. The second prism may also be fitted with the lens barrel through a prefabricated intermediate structure, and the fitting may also be reinforced with glue. Particularly, the intermediate structural component and the second prism may be separately formed and then fitted or bonded together, and then the intermediate structural component is fitted with the cylindrical support or the lens barrel through the first plug-in structure or the second plug-in structure.

Further, in an example of the present application, the third substrate may include a substrate body and a second wedge-shaped support body, and the inclined surface of the second prism is installed and bear against the inclined surface of the second wedge-shaped support body, and the second wedge-shaped support body may move relative to the base body under the driving of the driving module, thereby facilitating to realize functions of the periscopic camera module such as the optical image stabilization.

Further, in an example of the present application, the periscopic camera module may further include a connector and a flexible connecting strip. The connector may be connected to the base body by the flexible connecting strip. The base body may be the first base, the second substrate, the third substrate or the fourth substrate. There may be only one connector, or more than one. When there are multiple connectors, these connectors may be connected to different base bodies through different flexible connecting strips, respectively.

It should be noted that in this application, an edge area of the optical surface of the prism is usually an optically invalid area, i.e., the edge area of the optical surface may be opaque; at this time, in order to save volume or other purposes, part of the edge area of the prism may be cut (such as cutting one or more edges). For example, in some examples of the present application, the first reflective element may be a deformation of a triangular prism, such as a prism obtained by cutting at least one edge of the triangular prism; for the convenience of description, a prism obtained by cutting one or more edges of a triangular prism at the edge area is still regarded as a triangular prism. Similarly, when a prism is used for the second reflective element, an edge in the edge area may also be cut. For example, one or more edges of a prism of which a cross-section is a parallelogram may also be cut, and for the convenience of description, the cut prism is still regarded as a prism of which the cross-section is the parallelogram.

Further, according to an example of the present application, an electronic device based on a periscopic camera module is also provided. The electronic device may be, for example, a smartphone or a tablet computer. The electronic device may include the periscopic camera module described in any of the above examples, wherein the incident direction of the incident light of the first reflective element of the periscopic camera module is consistent with a thickness direction of the electronic device. The present example may contribute to realizing a telephoto function (or a high-magnification zoom function) in an electronic device having a small thickness.

Further, according to a series of examples of the present application, a series of periscopic camera modules with optical image stabilization function and their assembly structures are also provided, which will be described below with reference to multiple examples.

Figure 13:
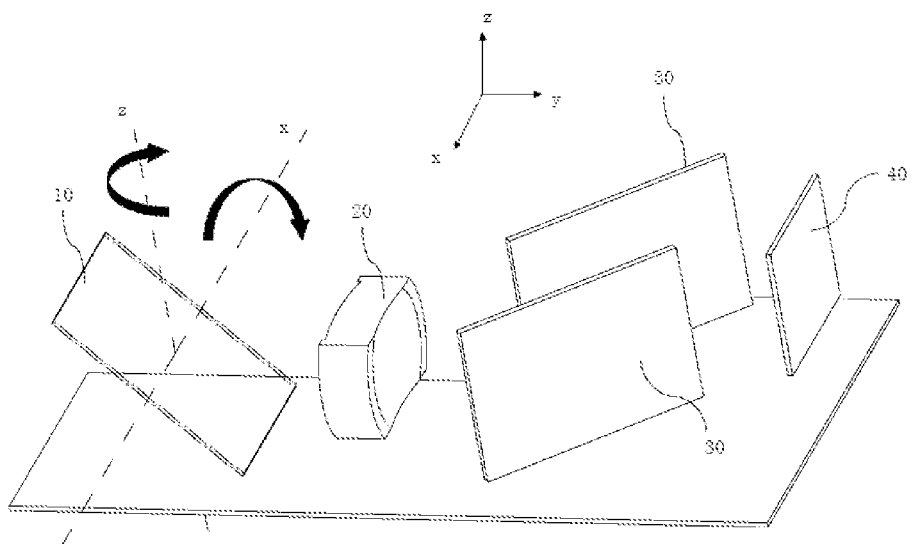
FIG. 13 shows a schematic perspective view of a periscopic camera module with an optical image stabilization function in an example of the present application.
Figure 14:
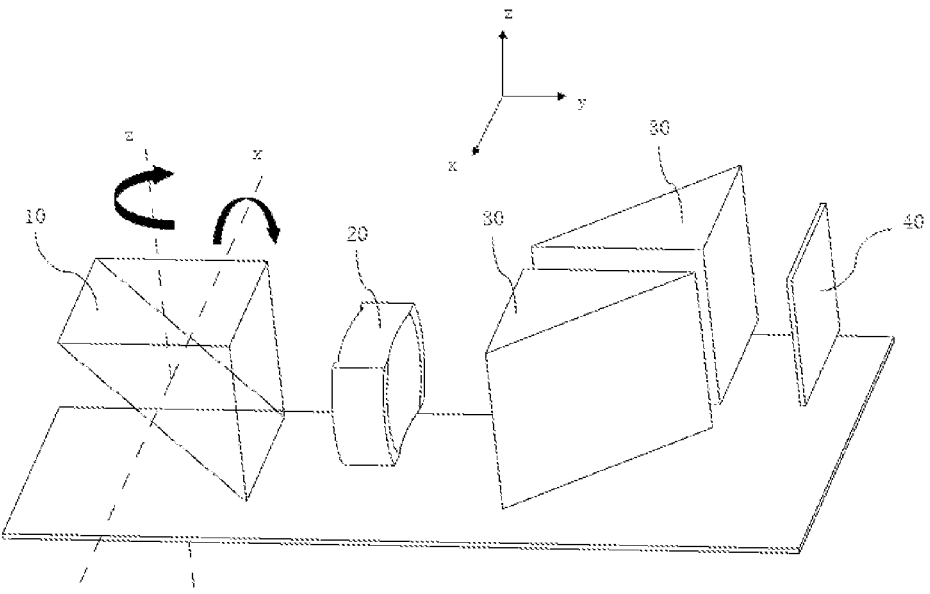
FIG. 14 shows a schematic perspective view of a periscopic camera module with an optical image stabilization function in another example of the present application.
Figure 15:
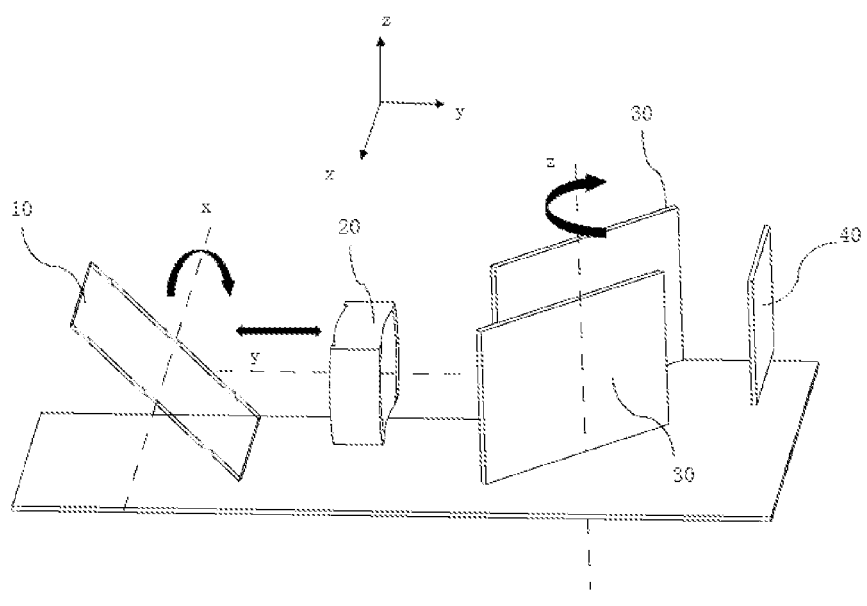
FIG. 15 shows a schematic perspective view of a periscopic camera module with an optical image stabilization function in yet another example of the present application.

Further, FIG. 13 shows a schematic perspective view of a periscopic camera module with an optical image stabilization function in an example of the present application. Referring to FIG. 13, in this example, the first reflective element 10 may rotate around the z-axis and the x-axis, wherein the z-axis is a coordinate axis parallel to the incident direction of the incident light, and the x-axis is a coordinate axis perpendicular to the z-axis and perpendicular to the optical axis of the optical lens 20. The optical lens 20 may be mounted on the second substrate, and the optical lens 20 may be translated along the y-axis under the driving of a second driving module; wherein the y-axis is a coordinate axis parallel to the optical axis of the optical lens 20. In this example, the second reflective element 30 includes two reflecting mirrors, and the second reflective element 30 may be fixed on a substrate (e.g., the third substrate). FIG. 14 shows a schematic perspective view of a periscopic camera module with an optical image stabilization function in another example of the present application. In this example, the first reflective element 10 is a triangular prism, and the second reflective element 20 includes two triangular prisms, and all optical surfaces of the second reflective element 20 are located on the side surfaces of the triangular prisms, wherein the optical surfaces include a reflecting surface, an incident surface and an exit surface, and the reflecting surface includes the second reflecting surface, and the second reflecting surface may make the light beam turn laterally. The rest parts of the periscopic camera module of this example may be the same as the example of FIG. 13, and will not be described again. Further, FIG. 15 shows a three-dimensional schematic diagram of a periscopic camera module with an optical image stabilization function in another example of the present application. Referring to FIG. 15, in this example, the first reflective element 10 may rotate around the x-axis under the driving of the first driving module; and the optical lens 20 is mounted on the second substrate, and the optical lens 20 may be translated along the y-axis under the driving of the second driving module; and the second reflective element 30 is mounted on the third substrate, and the second reflective element 30 may rotate around the z-axis under the driving of the third driving module; wherein the surfaces of the second substrate and the third substrate are both perpendicular to the z-axis. In this example, the first reflective element 10 may only have one degree of freedom in movement to rotate around the x-axis, i.e., does not provide a degree of freedom to rotate around the z-axis. At the same time, the second reflective element 30 has a degree of freedom to rotate around the z-axis. Under this design, both of the first reflective element 10 and the second reflective element 30 only need to provide one degree of freedom in rotation, thereby greatly simplifying its driving module, reducing the structural complexity, and facilitating to improve the mass production efficiency and yield. On the other hand, through the cooperation of the rotation of the first reflective element around the x-axis and the rotation of the second reflective element around the z-axis, the shaking of the photographed image in multiple directions may be well suppressed, so it is sufficient to meet the anti-shake requirement in camera shooting field of mobile phones (or other portable electronic devices) in most application scenarios.

Similarly, in another example of the present application, the first reflective element may only have one degree of freedom in movement to rotate around the z-axis, i.e., does not provide a degree of freedom to rotate around the x-axis. At the same time, the second reflective element still has a degree of freedom to rotate around the z-axis. Under this design, both of the first reflective element and the second reflective element only need to provide one degree of freedom in rotation, thereby greatly simplifying its driving module, reducing the structural complexity, and facilitating to improve the mass production efficiency and yield. On the other hand, through the cooperation of the rotation of the first reflective element around the z-axis and the rotation of the second reflective element around the z-axis, the shaking of the photographed image in multiple directions may be well suppressed, so it is sufficient to meet the anti-shake requirement in camera shooting field of mobile phones (or other portable electronic devices) in most application scenarios.

Figure 16:
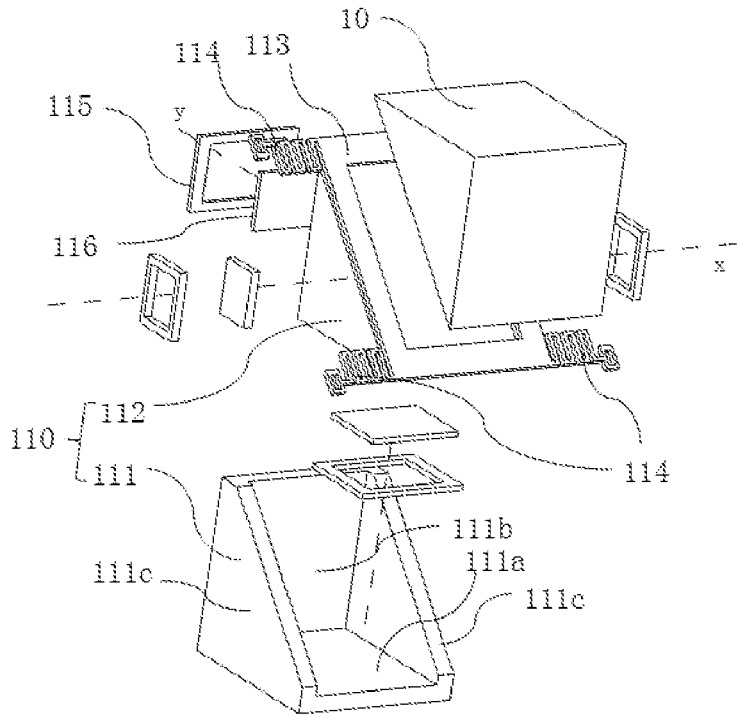
FIG. 16 shows a schematic diagram of a first reflective element 10 and its installation structures in an example of the present application.
Figure 17:
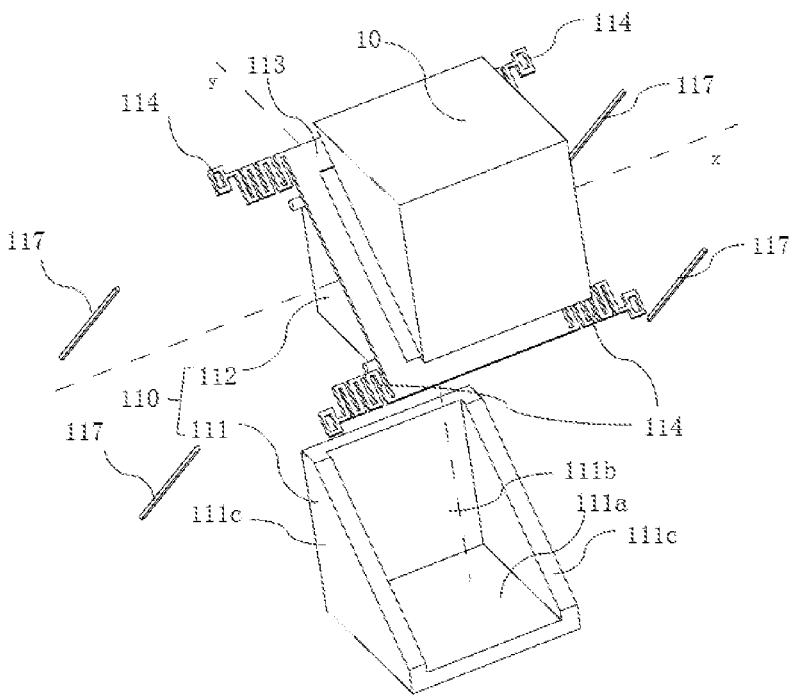
FIG. 17 shows a schematic diagram of a first reflective element 10 and its installation structures in another example of the present application.

Further, FIG. 16 shows a schematic diagram of the first reflective element 10 and its installation structures in an example of the present application. Referring to FIG. 16, in this example, the first reflective element 10 is mounted on the first base 110, and the first base 110 includes a base body 111 and a first wedge-shaped support body 112; wherein the base body 111 includes a base bottom-plate 111*a*, a base back-plate 111*b* and two base side-plates 111*c;* the first wedge-shaped support body 112 is installed in the base body 111, and the first wedge-shaped support body 112 is movably connected to the base body 111. The first reflective element 10 may be installed on an inclined surface of the first wedge-shaped support body 112. Particularly, the first reflective element may be a first prism, and the first prism is a triangular prism of which an inclined surface is bear against and fixed on the inclined surface of the first wedge-shaped support body 112. The first wedge-shaped support body 112 is elastically connected to the base body 111 through a frame-shaped elastic element 113, and the inclined surface of the first prism may be bear against the first wedge-shaped support body 112 through the frame-shaped elastic element 113. The frame-shaped elastic element 113 has multiple elastic pieces 114 connecting the frame-shaped elastic element to the base body 111. The first driving module may be a voice coil motor which includes a coil 115 and a magnet 116, and the coil 115 and the magnet 116 may be respectively installed on the base body 111 and the first wedge-shaped support body 112. The first drive module may include a z-axis rotation module and an x-axis rotation module; wherein the z-axis rotation module may include two sets of coils and magnets, and one set of coils and magnets are respectively mounted on one of the two base side-walls 111*c* and the corresponding side surface of the first wedge-shaped support body 112, and another set of coils and magnets are respectively mounted on the other of the two base side-walls 111*c* and the corresponding side surface of the first wedge-shaped support body 112; the x-axis rotation module also includes two sets of coils and magnets, wherein one set of coils and magnets are respectively installed on the base bottom-plate 111 a and the bottom surface of the first wedge-shaped support body 112, another group of coils and magnets are respectively installed on the base back-plate 111*b* and back surface of the wedge-shaped support body 112. This design may realize the function that the first reflective element may rotate around the z-axis and the x-axis in a relatively small volume, so as to provide a strong optical image stabilization capability for the periscopic camera module, while avoiding a too large volume of the module. In other examples, the first driving module may also be an SMA driver, a MEMS driver, a ball bearing motor or other drivers suitable for driving the first reflective element to rotate around an axis. FIG. 17 shows a schematic diagram of the first reflective element 10 and its installation structures in another example of the present application. In this example, an SMA driver is used as a driving module, i.e., an SMA wire 117 is used to drive the first reflective element 10 to move (e.g., rotation around the z-axis and/or the x-axis). In this example, the SMA driver may replace the voice coil motor, and the rest structures are the same as those of the example in FIG. 15, and will not be described again.

Figure 18:
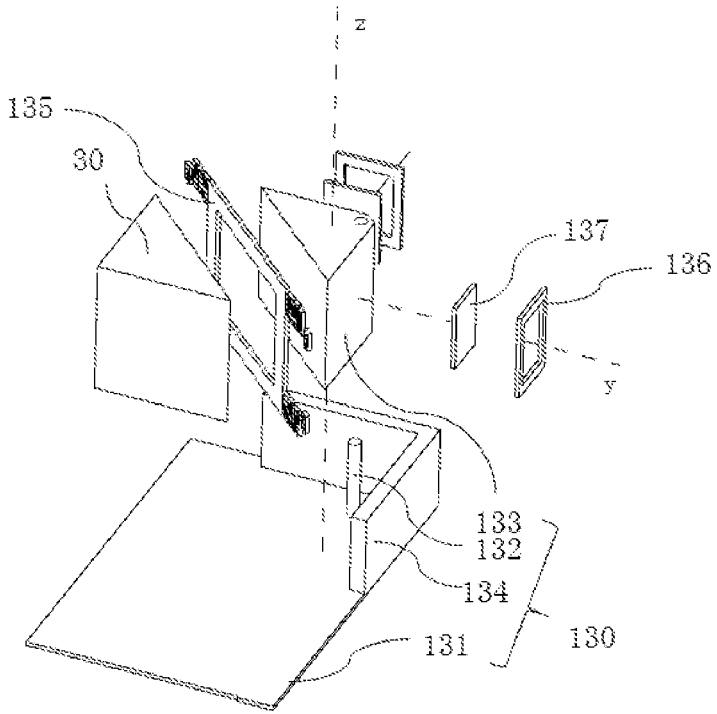
FIG. 18 shows a schematic diagram of a second reflective element 30 and its installation structures in an example of the present application.

Further, FIG. 18 shows a schematic diagram of the second reflective element 30 and its installation structures in an example of the present application. Referring to FIG. 18, in this example, the third substrate 130 may include: a third bottom-plate 131, a third rotating shaft 132 and a second wedge-shaped support 133; wherein the third rotating shaft 132 is fixed on and perpendicular to the third bottom-plate 131, and the second wedge-shaped support body 133 has a bearing hole adapted to the third rotating shaft 132 and is rotatably connected with the third rotating shaft 132. The second reflective element 30 and the second wedge-shaped support body 133 are fixed together. The third substrate 130 may further include a third side-plate 134, and the second wedge-shaped support body 133 is elastically connected to the third side-plate 134 through a frame-shaped elastic element 135. The second reflective element 30 may be a second prism, the second prism may be a triangular prism, and an inclined surface of the second prism is bear against the inclined surface of the second wedge-shaped support body 133 through the frame-shaped elastic element 135. The third drive module is a voice coil motor which includes a coil 136 and a magnet 137, wherein the coil 136 and the magnet 137 may be respectively installed on the third side-plate 134 and the corresponding side surface of the second wedge-shaped support body 133. The design of this example may realize the function of rotating the second reflective element around the z-axis in a relatively small volume, so as to provide a strong optical image stabilization capability for the periscopic camera module, while avoiding a too large volume of the module.

Further, in an example of the present application, the second reflective element includes at least two second reflecting surfaces, and the second reflecting surfaces are 45-degree reflecting surfaces; and the first reflective element has a first reflecting surface, the first reflecting surface is a 45-degree reflecting surface. The optical lens has an effective focal length greater than or equal to 18 mm or a field angle of less than or equal to 20 degrees. Preferably, the optical lens has an effective focal length greater than or equal to 25 mm or a field angle of less than or equal to 15 degrees.

Further, in an example of the present application, a cross-section of the second prism is a parallelogram, and two mutually parallel side surfaces of the second prism form two second reflecting surfaces, and all optical surfaces of the second reflective element are located on the side surfaces of the second prism, wherein the optical surfaces include a reflecting surface, an incident surface and an exit surface, and the reflecting surface includes the second reflecting surface.

Further, in an example of the present application, the periscopic camera module may further include a connector and a flexible connecting strip. The connector may be connected to the base body by the flexible connecting strip. The base body may be that of the first base, the second substrate, the third substrate, or the fourth substrate. There may be only one connector or more than one. When there are multiple connectors, these connectors may be connected to different base bodies through different flexible connecting strips, respectively.

Figure 19:
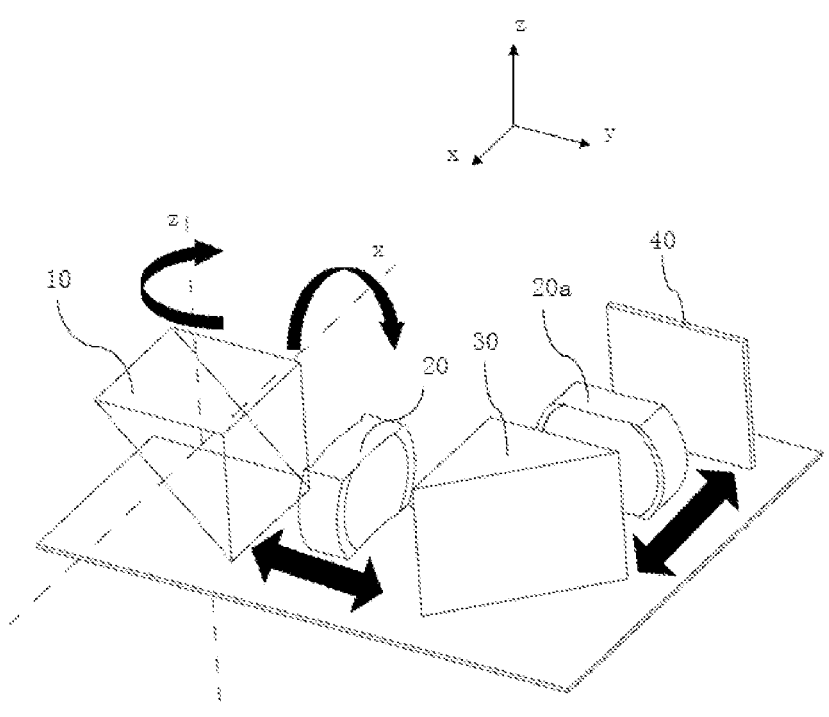
FIG. 19 shows a schematic perspective view of a periscopic zoom camera module in an example of the present application.

Further, FIG. 19 shows a schematic perspective view of a periscopic zoom camera module in an example of the present application. Referring to FIG. 19, in this example, the optical lens 20 located between the first reflective element 10 and the second reflective element 30 may be a focusing lens, and an additional focus lens 20a may be added between the second reflective element 30 and the photosensitive chip 40, the focusing lens and the focus lens 20a together constitute the imaging optical system of the camera module. Particularly, the focusing lens may be translated along the y-axis under the driving of the second driving module, and the focus lens 20a may be translated along the x-axis under the driving of the fourth driving module (in this example, both the of first reflective element 10 and the second reflecting element 30 adopt a triangular prism). The focusing lens may adopt a lens group with certain optical parameters, so that the effective focal length of the imaging optical system of the camera module is sensitive to the translation of the focusing lens along the y-axis, thereby realizing focusing. While the focus lens 20a may adopt a lens group with certain optical parameters, so that the effective focal length of the imaging optical system of the camera module is not sensitive to the translation of the focus lens along the x-axis, and the back focus of the imaging optical system is sensitive to the translation of the focus lens along the x-axis. Under this design, through the controlled movement of the focusing lens, the zoom function may be realized on the basis of the telephoto module; at the same time, for the problem of out-of-focus on the photosensitive surface caused by focusing, the controlled movement of the focus lens 20a may be used to solve it. Moreover, in this example, the moving lines of the focusing lens and the focus lens 20a are perpendicular to each other, thereby facilitating to reduce the length of the camera module. Further, in this example, the first reflective element 10 may rotate around the z-axis and around the x-axis under the driving of the first driving module. In this example, the periscopic camera module is a telephoto camera module, and has the function of optical zoom, so that the periscopic camera module is more sensitive to optical shake, and requires more optical image stabilization. The first reflective element 10 rotates around both of the Z-axis and the X-axis to realize optical image stabilization in two directions, thereby better overcoming the picture problem caused by the shake of the zoom module. In addition, it should be noted that although in this example, the focusing lens and the focus lens together constitute the imaging optical system, since the movement of the focus lens is not sensitive to the effective focal length of the imaging optical system, it mainly plays the role of adjusting the back focus, i.e., the influence of the focus lens on the imaging optical system itself is relatively small, so in this application, the light beam output by the focusing lens may be regarded as the imageable light beam (or may be regarded approximately as the imageable light beam).

Figure 20:
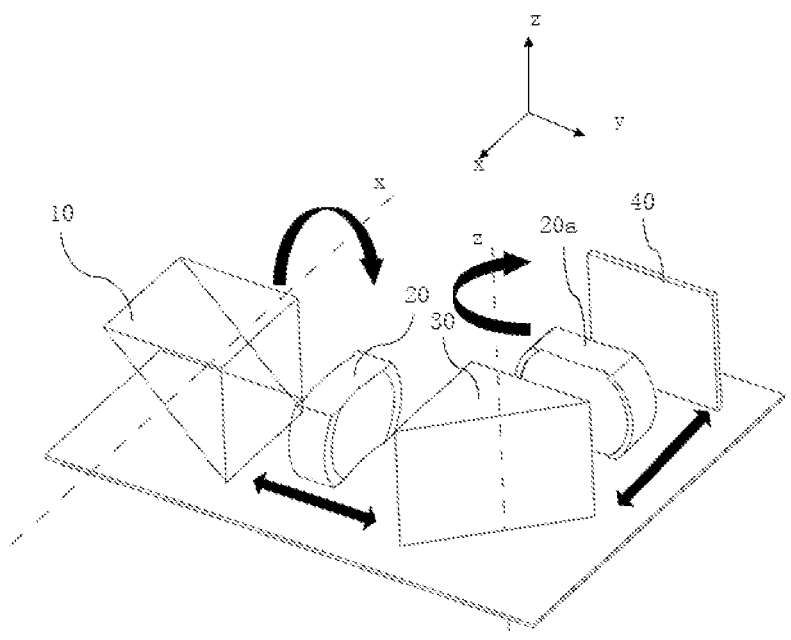
FIG. 20 shows a schematic perspective view of a periscopic zoom camera module in another example of the present application.

Further, FIG. 20 shows a three-dimensional schematic diagram of a periscopic zoom camera module in another example of the present application. Different from the previous example, in this example, the first reflective element 10 reduces one degree of freedom of movement, and only rotates around the x-axis. Meanwhile, the second reflective element 30 may rotate around the z-axis. Under this design, both of the first reflective element 10 and the second reflective element 30 only need to be provided with one degree of freedom in rotation, thereby greatly simplifying its driving module, reducing the structural complexity, and facilitating to improve the mass production efficiency and yield. On the other hand, through the coordination of the rotation of the first reflective element 10 around the x-axis and the rotation of the second reflective element 30 around the z-axis, the shaking of the photographed image in multiple directions may be well suppressed, so it is sufficient to meet the anti-shake requirement in camera shooting field of mobile phones (or other portable electronic devices) in most application scenarios. In addition, in this example, a zoom function may also be realized, thereby greatly improving user experience.

Figure 21:
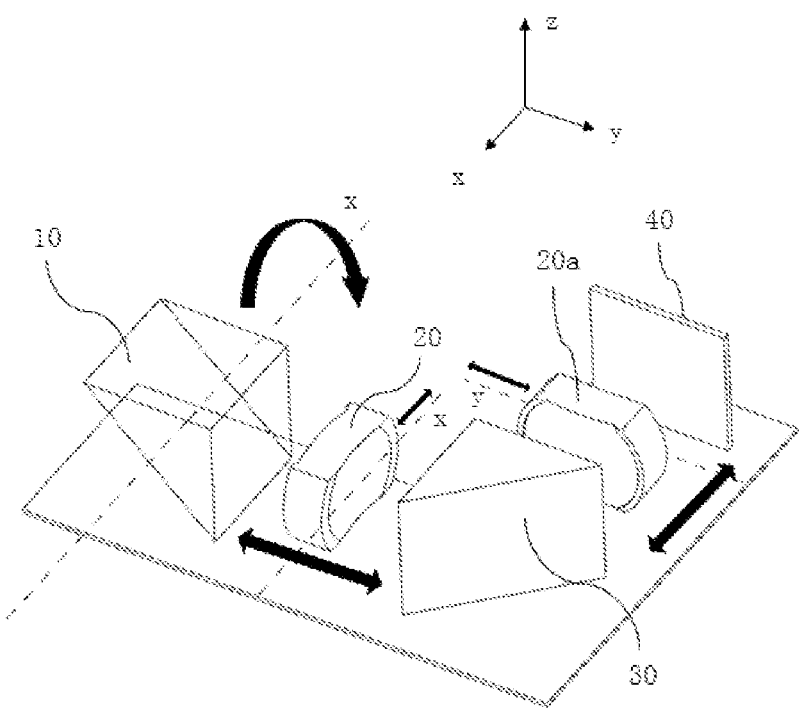
FIG. 21 shows a schematic perspective view of a periscopic zoom camera module in yet another example of the present application.

Further, FIG. 21 shows a three-dimensional schematic diagram of a periscopic zoom camera module in yet another example of the present application. Referring to FIG. 21, in this example, compared with the example of FIG. 19, the first reflective element 10 reduces one degree of freedom in movement, and only rotates around the x-axis. At the same time, the focusing lens may be translated along the x-axis in addition to the y-axis, and the focus lens may also be translated along the y-axis in addition to the x-axis. Under this design, the first reflective element 10 only needs to be provided with one degree of freedom in rotation, thereby greatly simplifying its driving module, reducing the structural complexity, and facilitating to improve the mass production efficiency and yield. On the other hand, through the coordination of the rotation of the first reflective element 10 around the x-axis and the translations of the focusing lens and the focus lens 20*a* in the directions perpendicular to the respective optical axes, the shaking of the photographed image in multiple directions may be well suppressed, so it is sufficient to meet the anti-shake requirement in camera shooting field of mobile phones (or other portable electronic devices) in most application scenarios. In addition, in this example, a zoom function may also be realized, thereby greatly improving user experience.

It should be noted that in this application, an edge area of the optical surface of the prism is usually an optically invalid area, i.e., the edge area of the optical surface may be opaque; at this time, in order to save volume or other purposes, part of the edge area of the prism may be cut (such as cutting one or more edges). For example, in some examples of the present application, the first reflective element may be a deformation of a triangular prism, such as a prism obtained by cutting at least one edge of the triangular prism; for the convenience of description, a prism obtained by cutting one or more edges of a triangular prism at the edge area is still regarded as a triangular prism. Similarly, when a prism is used for a second reflective element, an edge in its edge area may also be cut. For example, one or more edges of a prism of which a cross-section is a parallelogram may also be cut; for the convenience of description, the cut prism is still regarded as a prism of which a cross-section is a parallelogram.

Further, according to an example of the present application, an electronic device based on a periscopic camera module is also provided. The electronic device may be, for example, a smartphone or a tablet computer. The electronic device may include the periscopic camera module described in any of the above examples, wherein the incident direction of the incident light of the first reflective element of the periscopic camera module is consistent with a thickness direction of the electronic device. The present example may contribute to realizing a telephoto function (or a high-magnification zoom function) in an electronic device having a small thickness.

Further, in a series of modified examples of the present application, a variety of periscopic camera modules based on modified special-shaped prisms are also provided. The following descriptions are respectively made with reference to multiple examples.

Figure 22:
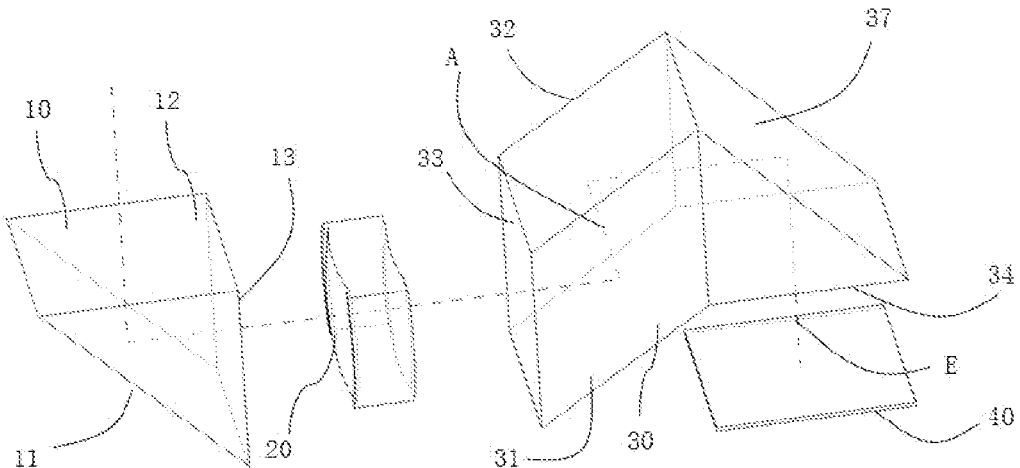
FIG. 22 shows a schematic perspective view of an optical path and optical elements of a periscopic camera module in yet another example of the present application.

Further, FIG. 22 shows a three-dimensional schematic diagram of an optical path and optical elements of a periscopic camera module in another example of the present application. Referring to FIG. 22, in this example, the second reflective element 30 is implemented by a special-shaped prism. The shape of the special-shaped prism is composed of a prism body of which a cross-section is a parallelogram and a triangular prism body. In terms of specific implementation, the second reflective element 30 in this example may be integrally formed, or may be formed by splicing (e.g., bonding) two single prisms, or may be obtained by cold-process such as cutting or grinding the optical glass, wherein in the course of cold-process, a process such as water rinsing may be combined. Particularly, the prism body of which the cross-section is the parallelogram may be consistent with the shape of the second reflective element in FIG. 1. Two mutually parallel side surfaces of the parallelogram prism body may form two second reflecting surfaces 31 and 32, and the inclined surfaces of the triangular prism body may form a third reflecting surface 37. In the optical path, the third reflecting surface 37 is located at the rear end of the two second reflecting surfaces 31 and 32. The third reflecting surface 37 may receive the imageable light beams reflected by the two second reflecting surfaces 31, 32 and turn them longitudinally. After the longitudinal turning, an exit direction of the imageable light beam is consistent with the original incident light of the periscopic camera module. In this way, the incident direction of the incident light entering the first reflective element 10 may be perpendicular to the photosensitive surface of the photosensitive chip 40. In this example, the second reflective element 30 is a single optical element having the second reflecting surfaces 31 and 32 and the third reflecting surface 37. The telephoto periscopic module with a special-shaped prism provided in this example may have an effective focal length greater than or equal to 18 mm, or it may have a field angle of less than or equal to 20 degrees. Preferably, the telephoto periscopic module may have an effective focal length greater than or equal to 25 mm, or it may have a field angle of less than or equal to 15 degrees. In this example, after the imageable light beam enters the second reflective element 30, the lateral turning A is generated by the reflection of the first one of the second reflecting surface 31, and the lateral turning B is generated by the reflection of the second one of the second reflecting surface 32, and then a longitudinal turning E is then generated by the reflection of the third reflecting surface 37, finally entering the photosensitive chip. This optical path design may reduce the length of the camera module, and the reduction amount is approximately the sum of the lengths of the lateral turning A and the longitudinal turning E. It should be noted that, in a modified example, the number of the second reflective elements may also be two or more. The second reflecting surface and the third reflecting surface may be located on different second reflective elements, respectively.

Figure 23:
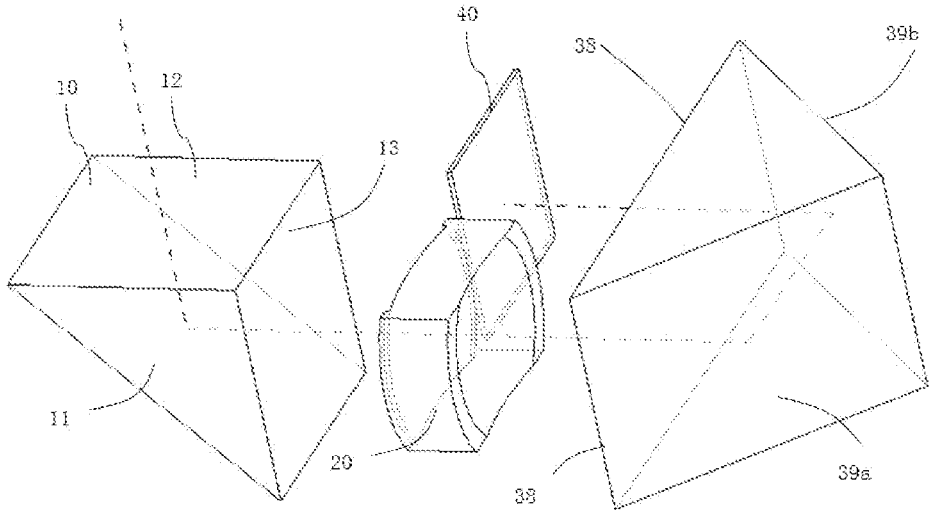
FIG. 23 shows a schematic perspective view of an optical path and optical elements of a periscopic camera module in still another example of the present application.
Figure 24:
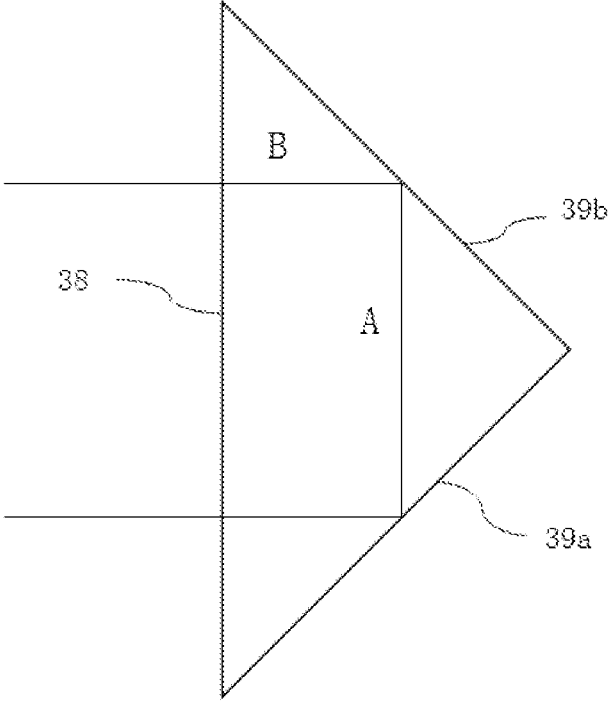
FIG. 24 shows a schematic diagram of an internal light path of a second reflective element of a periscopic camera module in still another example of the present application.

Further, FIG. 23 shows a three-dimensional schematic diagram of an optical path and optical elements of a periscopic camera module in still another example of the present application. FIG. 24 shows a schematic diagram of an internal light path of the second reflective element of the periscopic camera module in still another example of the present application. Referring to FIG. 23 and FIG. 24, in this example, the second reflective element 30 is a triangular prism, but different from the common triangular prism described above, in this example, an inclined surface 38 of the triangular prism is used as the incident surface and the exit surface, and the two mutually perpendicular side surfaces serve as two second reflecting surfaces 39*a* and 39*b*, respectively. The two second reflecting surfaces 39*a* and 39*b* may respectively turn the incident imageable light beam (the light beam from the optical lens 20) to a lateral turning A and a lateral turning B, so that the transmission direction of the imageable light beam is folded back at 180 degrees. In this way, the length of the periscopic camera module may be reduced, thereby making the structure of the module more compact.

Figure 25:
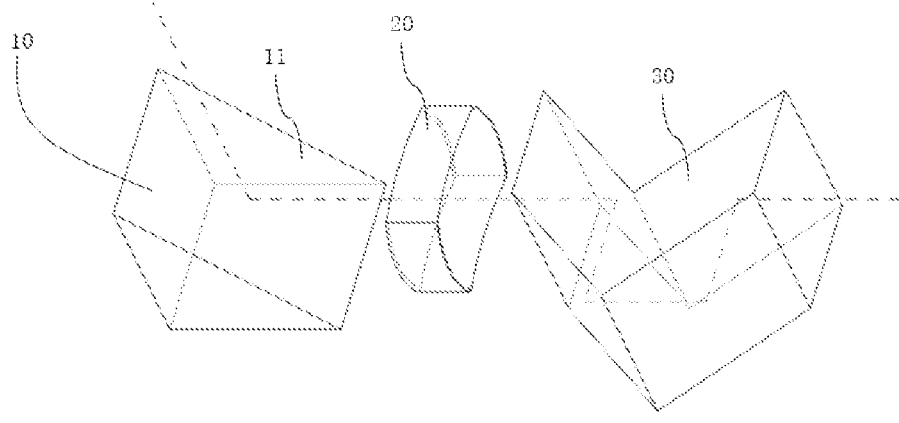
FIG. 25 shows a schematic perspective view of an optical path and optical elements of a periscopic camera module in still another example of the present application.

Further, FIG. 25 shows a three-dimensional schematic diagram of the optical path and the optical elements of a periscopic camera module in still another example of the present application. In this example, the first reflective element 10 is constituted by a reflecting mirror, and the reflecting mirror is a 45-degree mirror. In this example, the reflecting mirror may be arranged on the inclined surface of the triangular body, but it should be noted that the triangular body is not a triangular prism, the incident light enters directly on the first reflecting surface 11, and the incident light does not need to enter into the inside of the triangular prism. In this example, the second reflective element 30 adopts a special-shaped prism with a "V"-shaped structure, which has two groups of four second reflecting surfaces. It should be noted that the photosensitive chip 40 is not shown in FIG. 25. In this example, the incident direction of the incident light of the first reflective element 10 may be parallel to the photosensitive surface of the photosensitive chip 40.

Figure 26:
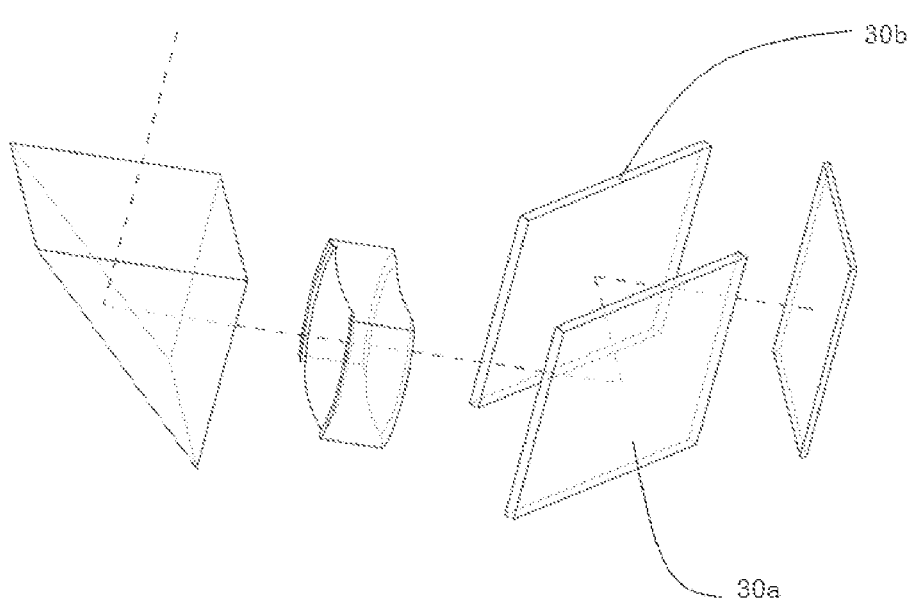
FIG. 26 shows a schematic perspective view of an optical path and optical elements of a periscopic camera module in still another example of the present application.

Further, FIG. 26 shows a three-dimensional schematic diagram of an optical path and the optical elements of a periscopic camera module in still another example of the present application. In this example, the second reflective element may include two second reflecting mirrors 30a and 30b, each of the second reflecting mirrors may have one of the second reflecting surfaces, and the second reflecting mirror may be a 45-degree reflecting mirror. The two second mirrors 30a, 30b may be parallel to each other. The function of the second reflecting surface may be the same as that of the second reflecting surface in the example of FIG. 1, thereby reducing the length of the periscopic camera module.

Figure 27:
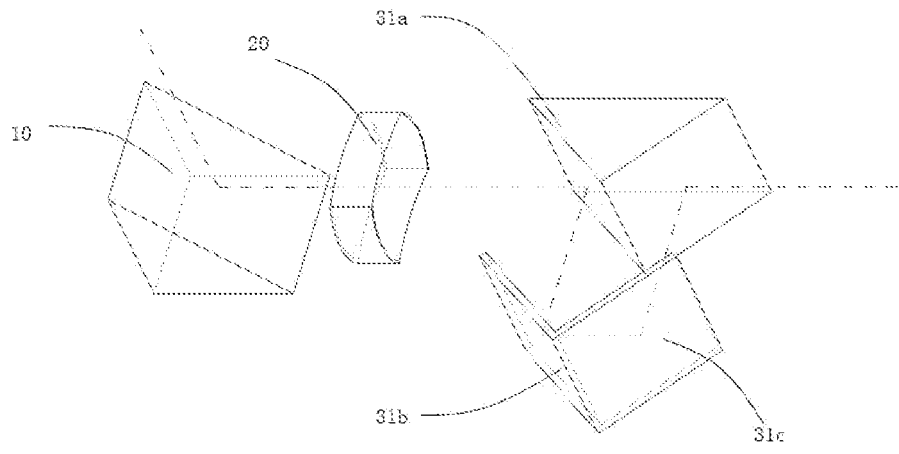
FIG. 27 shows a schematic perspective view of an optical path and optical elements of a periscopic camera module in still another example of the present application.

Further, FIG. 27 shows a three-dimensional schematic diagram of an optical path and optical elements of a periscopic camera module in still another example of the present application. In this example, the second reflective elements may all be implemented by reflecting mirrors. Particularly, the reflecting mirror may be a plane mirror or a prism body, but the incident light does not enter the prism body, but is reflected on the surface of the prism body based on the principle of specular reflection. Referring to FIG. 27, the second reflective element includes a triangular body 31a and two plane mirrors 31b and 31c, wherein the two mutually perpendicular side surfaces of the triangular prism 31a form two reflecting surfaces, and the two plane mirrors 31b and 31c form the other two reflecting surfaces. Further, in a modified example, the second reflective element may also be formed by a combination of a prism and a reflecting mirror, and among the multiple second reflecting surfaces, a part of them may be located on the prism, and another part may be located on the reflecting mirror.

Further, in an example of the present application, in the periscopic camera module, the first reflective element may have a first driver (or a first actuator), wherein the first driver may drive the first reflective element to rotate or move linearly (i.e., translates), thereby realizing the optical image stabilization function of the periscopic camera module.

Further, in an example of the present application, in the periscopic camera module, the optical lens may have a second driver (or referred to as a second actuator), and the second driver may drive the optical lens to move so that the optical lens may have optical image stabilization.

Further, in an example of the present application, in the periscopic camera module, the optical lens may have a second driver, and the second driver may drive the optical lens to move and change the distance between the optical lens and the photosensitive chip, so that the camera module may have the function of auto focus.

Further, in an example of the present application, in the periscopic camera module, the optical lens may be fixed on the bottom substrate, so that the distance between the optical lens and the photosensitive chip remains unchanged, i.e., the periscopic camera module may be a fixed-focus module, thereby facilitating to simplify the structure of the module and reduce the volume of the module.

It should be noted that in this application, the edge area of the optical surface of the prism is usually an optically invalid area, i.e., the edge area of the optical surface may not be opaque; at this time, in order to save volume or other purposes, part of the edge area of the prism may be cut (such as cutting one edge or multiple edges). For example, in some examples of the present application, the first reflective element may be a deformation of a triangular prism, such as a prism obtained by cutting at least one edge of the triangular prism; for the convenience of description, a prism obtained by cutting one or more edges of a triangular prism at the edge area is still regarded as a triangular prism. Similarly, when a prism is used for the second reflective element, an edge in the edge area may also be cut. For example, one or more edges of a prism of which a cross-section is a parallelogram may also be cut; for the convenience of description, the cut prism is still regarded as a prism of which a cross-section is a parallelogram.

Moreover, in addition to the effective focal length, the concept of equivalent focal length is often used in the market. The size of the equivalent focal length is not only affected by the actual effective focal length of the optical lens, but also related to the size of the photosensitive chip. In the field of smartphones, a diagonal size of a common photosensitive chip (referring to the diagonal size of an actual photosensitive area that may receive an imageable light beam) is generally 4.5-6 mm. Therefore, in the field of smartphones, when the effective focal length of the optical lens is 15 mm, the equivalent focal length may exceed 140 mm; when the effective focal length of the optical lens is 18 mm, the equivalent focal length may exceed 170 mm; and when the effective focal length of the optical lens is 25 mm, the equivalent focal length may exceed 240 mm. It can be seen that, by using the periscopic camera module of the present application, excellent telephoto capability may be obtained.

Further, according to an example of the present application, an electronic device based on a periscopic camera module is also provided. The electronic device may be, for example, a smartphone or a tablet computer. The electronic device may include the periscopic camera module described in any of the above examples, wherein the incident direction of the incident light of the first reflective element of the periscopic camera module is consistent with a thickness direction of the electronic device. The present example may contribute to realizing a telephoto function (or a high-magnification zoom function) in an electronic device having a small thickness.

The above descriptions are only preferred examples of the present application and an illustration of the applied technical principles. Those skilled in the art should understand that, the scope of the invention involved in this application is not limited to the technical solution formed by the specific combination of the above technical features, and should also cover other technical solutions formed by any combination of the above technical features and its equivalent features without departing from the inventive concept of the application; for example, there may be a technical solution formed by replacing the above features with the technical features disclosed in this application (but not limited to) with similar functions.

The invention claimed is:

1. A periscopic camera module, characterized by comprising:

a first reflective element, which is used to reflect incident light and make it longitudinally turned, wherein the first reflective element is mounted on a first base;

an optical lens, which is used to receive the light reflected by the first reflective element and output an imageable light beam to an image side, wherein the optical lens is mounted on a second substrate;

a second reflective element, which includes at least one second reflecting surface adapted to laterally turn the imageable light beam at least once, wherein the second reflective element is a single second prism, and the at least one second reflecting surface is located on a side surface of the second prism, and the second prism is mounted on a third substrate, and surfaces of the second substrate and the third substrate are both perpendicular to an incident direction of an incident light; and a photosensitive chip, which is adapted to receive the imageable light beam laterally turned by the second reflective element, wherein the photosensitive chip is adhered to a fourth substrate, and a surface of the fourth substrate is parallel to the incident direction of the incident light, wherein a cross-section of the second prism in a direction perpendicular with the incident direction of the incident light is a parallelogram, and two mutually parallel side surfaces of the second prism form two reflecting surfaces, and all optical surfaces of the second reflective element are located on the side surfaces of the second prism, and the optical surfaces include a reflecting surface, an incident surface and an exit surface, and the reflecting surface of the optical surfaces includes the at least one second reflecting surface.

2. The periscopic camera module according to claim 1, wherein a bottom surface of the second prism bears against the third substrate, and the second prism and the third substrate are fixed together by adhering to or fitting with each other.

3. The periscopic camera module according to claim 1, wherein the second reflective element includes at least two second reflecting surfaces which are 45-degree reflecting surfaces, and the first reflective element has a first reflecting surface which is a 45-degree reflecting surface.

4. The periscopic camera module according to claim 1, further includes a cylindrical support which has an axis, a first open end and a second open end, wherein the axis is perpendicular to a surface of the fourth substrate, and the fourth substrate is mounted on the first open end, and the second open end is arranged at a position facing an exit surface of the second reflective element.

5. The periscopic camera module according to claim 4, wherein the exit surface of the second prism and the second open end have a first plug-in structure for adapting to each other, and the second prism is fitted with the cylindrical support through the first plug-in structure.

6. The periscopic camera module according to claim 4, wherein the first base, the second substrate, the third substrate and the bottom surface of the cylindrical support are all mounted on a same reinforcement plate.

7. The periscopic camera module according to claim 1, wherein the second substrate and the third substrate are a common substrate.

8. The periscopic camera module according to claim 1, wherein the first reflective element is a first prism which is a triangular prism, and the inclined surface of the triangular prism is a reflecting surface, and the two mutually perpendicular side surfaces are respectively used as an incident surface and an exit surface of the first reflective element.

9. The periscopic camera module according to claim 8, wherein the first base includes a base body and a first wedge-shaped support body installed in the base body, and the inclined surface of the first prism is installed and bears against an inclined surface of the first wedge-shaped support body.

10. The periscopic camera module according to claim 9, wherein the first base further includes a driving module which is adapted to drive the first wedge-shaped support body to move relative to the base body.

11. The periscopic camera module according to claim 1, wherein the optical lens includes a lens barrel and at least three lenses installed in the lens barrel, and a surface of the second substrate has positioning posts, and the lens barrel is mounted on the second substrate through the positioning posts.

12. The periscopic camera module according to claim 11, wherein an outer contour of the lens barrel is rectangular, and a rear end of the lens barrel and the incident surface of the second prism have a second plug-in structure for adapting to each other, and the second prism is fitted with the lens barrel through the second plug-in structure.

13. The periscopic camera module according to claim 1, wherein the first reflective element is movably mounted on the first base which has a first driving module, and the first driving module can drive the first reflective element to rotate.

14. The periscopic camera module according to claim 13, wherein the first reflective element is rotatable around a z-axis and/or a x-axis, and the z-axis is a coordinate axis parallel to the incident direction of the incident light, and the x-axis is a coordinate axis perpendicular to the z-axis and perpendicular to an optical axis of the optical lens;

wherein the optical lens is mounted on the second substrate, and the periscopic camera module further includes a second driving module, and the optical lens can be translated along a y-axis under the driving of the second driving module, and the y-axis is a coordinate axis parallel to the optical axis of the optical lens; and wherein the second reflective element is mounted on the third substrate, and the surfaces of the second substrate and the third substrate are both perpendicular to the z-axis, and the periscopic camera module further includes a third driving module, and the second reflective element can rotate around the z-axis under the driving of the third driving module.

15. An electronic device, characterized by comprising: the periscopic camera module according to claim 1, wherein the incident direction of the incident light of the first reflective element is consistent with a thickness direction of the electronic device.

* * * * *